(12) United States Patent
Kondo et al.

(10) Patent No.: US 7,798,767 B2
(45) Date of Patent: Sep. 21, 2010

(54) CASING AND GAS TURBINE

(75) Inventors: Mitsuru Kondo, Takasago (JP); Koichi Ishizaka, Takasago (JP); Yoshifumi Iwasaki, Takasago (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 911 days.

(21) Appl. No.: 11/658,260

(22) PCT Filed: Jul. 26, 2005

(86) PCT No.: PCT/JP2005/013619

§ 371 (c)(1),
(2), (4) Date: Jan. 24, 2007

(87) PCT Pub. No.: WO2006/011465

PCT Pub. Date: Feb. 2, 2006

(65) Prior Publication Data

US 2008/0310949 A1    Dec. 18, 2008

(30) Foreign Application Priority Data

Jul. 28, 2004    (JP) .............................. 2004-219559

(51) Int. Cl.
*F01D 25/26* (2006.01)
(52) U.S. Cl. ...................... 415/108; 415/116
(58) Field of Classification Search .................. 415/108
See application file for complete search history.

(56) References Cited

U.S. PATENT DOCUMENTS

| 5,172,553 | A | * | 12/1992 | Barton et al. | ................. 60/656 |
| 5,388,960 | A | * | 2/1995 | Suzuki et al. | ............... 415/108 |
| 2001/0022933 | A1 | | 9/2001 | Bangert et al. | |

FOREIGN PATENT DOCUMENTS

| JP | 5-288007 A | 11/1993 |
| JP | 6-2570 A | 1/1994 |
| JP | 6-26364 A | 2/1994 |
| JP | 6-117204 A | 4/1994 |
| JP | 2002-523661 A | 7/2002 |
| JP | 2003-254010 A | 9/2003 |
| JP | 2004-052567 A | 2/2004 |

OTHER PUBLICATIONS

International Search Report of PCT/JP2005/013619, date of mailing Nov. 15, 2005.

* cited by examiner

*Primary Examiner*—Richard Edgar
(74) *Attorney, Agent, or Firm*—Westerman, Hattori, Daniels & Adrian, LLP

(57) ABSTRACT

A valve (6) for supplying the external air to the inside of an upper casing (5a) is provided to the upper casing (5a), and when the operation of a gas turbine is stopped, the external air is introduced from the upper casing (5a) to the inside of the casing (5). When the external air is introduced from the upper casing (5a), the upper casing (5a) is cooled to prevent thermal deformation of the casing (5).

19 Claims, 20 Drawing Sheets

CASING AND GAS TURBINE

TECHNICAL FIELD

The present invention relates to a casing, which provides an interior thereof with high-temperature ambience and restrains a temperature deviation being caused to each region inside the interior, and also relates to a gas turbine that is provided with such a casing as aforementioned.

BACKGROUND ART

In recent years, during the operation of a gas turbine the ambience of a casing interior being covered by the casing becomes high temperature and high pressure. Therefore, when a gas turbine is shut down without taking any actions after the operation, a convective flow is generated inside the casing because the casing interior has a high temperature ambience, and as a result, a temperature deviation occurs inside the casing interior. To be specific, because the high temperature air moves to an upper level area, the upper level area inside the casing interior becomes higher temperature, compared with the lower level area. Due to effects of the temperature deviation inside the casing interior, the upper half of a turbine rotor becomes higher temperature than the lower half. Consequently, because there arises a difference in thermal expansion between the upper half and the lower half, the rotor becomes warped and thermally deformed due to the difference in thermal expansion. In order to prevent the thermal deformation of the rotor, conventionally, turning operation is performed after the operation of a gas turbine is stopped, so as to rotate the gas turbine at a very slow speed as much as 2 to 5 rpm.

In addition, the temperature deviation that occurs inside the casing interior effects not only the rotor but also the casing. Specifically, the temperature of the upper part of the casing becomes higher than the temperature of the lower part of the casing, leading to a difference in thermal expansion between the upper part and the lower part of the casing in a similar manner as the rotor. Therefore, the upper part of the casing is warped, causing a thermal deformation. The thermal deformation of the casing is referred to as a "cat-back deformation." When the casing is subject to a cat-back deformation in such a manner as described above and the deformation amount thereof exceeds a permissible amount, an incident of contact occurs between the casing and the rotor in turning operation. In order to prevent an incident of contact, the present applicant suggests a gas turbine in which the temperature inside the casing interior is equalized by increasing the revolution speed of the rotor so as to perform spinning operation instead of turning operation when a temperature difference occurs between the upper part and the lower part of the casing. (See Patent Literature 1.)

Patent Literature 1: Patent Application Laid Open as H6-2570.

DISCLOSURE OF THE INVENTION

Issue to be Solved by the Invention

However, in a case of reducing the temperature deviation inside a casing interior by having a rotor perform spinning operation as in the conventional manner, a driving force for spinning operation is necessary, which requires electrical power cost in order to generate the driving force. In addition, the timing to perform spinning operation is determined by detecting the temperature of the casing. However, because in practice it is necessary to perform spinning operation under supervision of an operator, a large amount of cost will be imposed on the user.

It is an object of the present invention to provide a casing that can restrain the cat-back deformation by being equipped with a mechanism to restrain the temperature deviation inside after the operation of the gas turbine is stopped. In addition, it is another object of the present invention to provide a gas turbine being equipped with a casing that can restrain the cat-back deformation.

Means to Solve the Issue

In order to achieve the object, a casing in accordance with the present invention comprises an upper casing covering an upper half of a rotating body that is rotated by high temperature fluid; a lower casing covering a lower half of the rotating body; a valve controlling supply of cooling air that cools the upper casing; and an air inlet port introducing the external air that is supplied from the valve to a cooling air flow path where the cooling air that cools the upper casing flows; wherein, after stopping operation of the rotating body by the high temperature fluid, the valve is opened so as to introduce the external air to the cooling air flow path from the air inlet port.

In such a casing as mentioned hereinabove, by providing an air inlet port to the upper casing, by having a cooling air flow path formed in the casing comprising the upper casing and the lower casing, and by having the cooling air flow to the casing being covered by the upper casing, an increase in temperature of the upper casing can be restrained, thereby restraining thermal deformation of the casing.

In addition, the gas turbine in accordance with the present invention comprises a compressor which compresses external air; a combustor which burns a fuel by using air being compressed by the compressor; a turbine which is rotated by supply of combustion gas being obtained by the combustor; and casings which cover the compressor, the combustor and the turbine, respectively; wherein, the casing is constructed in such a manner as mentioned hereinabove, having the rotating body consist of a compressor and a turbine that are provided with rotating blades to the circumference thereof; and a temperature difference between the upper casing and the lower casing is controlled so as to be reduced by opening the valve and introducing the cooling air to the air inlet port after stopping the operation.

Effects of the Invention

In accordance with the present invention, because an air inlet port is provided for introducing the cooling air in order to cool the upper casing after the operation is stopped, compared with the temperature of the lower casing, it is possible to prevent the temperature of the upper casing from becoming higher after the operation is stopped. In consequence, the difference in temperature between the upper casing and the lower casing can be made small, thereby preventing the thermal deformation of the casing.

Additionally, because the cooling air can be introduced into the inside of the upper casing, the temperature of the casing interior can be prevented from being distributed, and a uniform temperature can be achieved, thereby preventing the thermal deformation of the casing. Moreover, because the cooling air can flow on the outside wall surface of the upper casing by providing a cover to the outside wall surface of the upper casing, the difference in temperature between the upper casing and the lower casing can be decreased, thereby preventing the thermal deformation of the casing.

Furthermore, by forming the air inlet port in such a manner as the tooling air can be injected to a heat source, the heat source can be cooled rapidly, which prevents the casing interior from becoming high temperature, thereby preventing the thermal deformation of the casing. Moreover, by forming the air inlet port in such a manner as the cooling air can be injected to the inside wall surface of the upper casing, the upper casing can be cooled rapidly, which makes the difference in temperature between the upper casing and the lower casing small, thereby preventing the thermal deformation of the casing.

DESCRIPTION OF SYMBOLS

1. Compressor
2. Combustor
3. Turbine
4. Rotor
5. Casing
6. Valve
7. Blower
8. Plant
9. Air Flow Path
10. Cover
11. Thermal Insulation Material
12. Air Flow Path
13. Air Inlet Port
14. Air Outlet Port
20a. and 20b. Temperature Detectors
21. Air Flow Control Valve
22. Fuel Flow Control Valve
23. Control System
24. Motor

BEST MODE FOR CARRYING OUT OF THE INVENTION

First Embodiment

Figure 1:
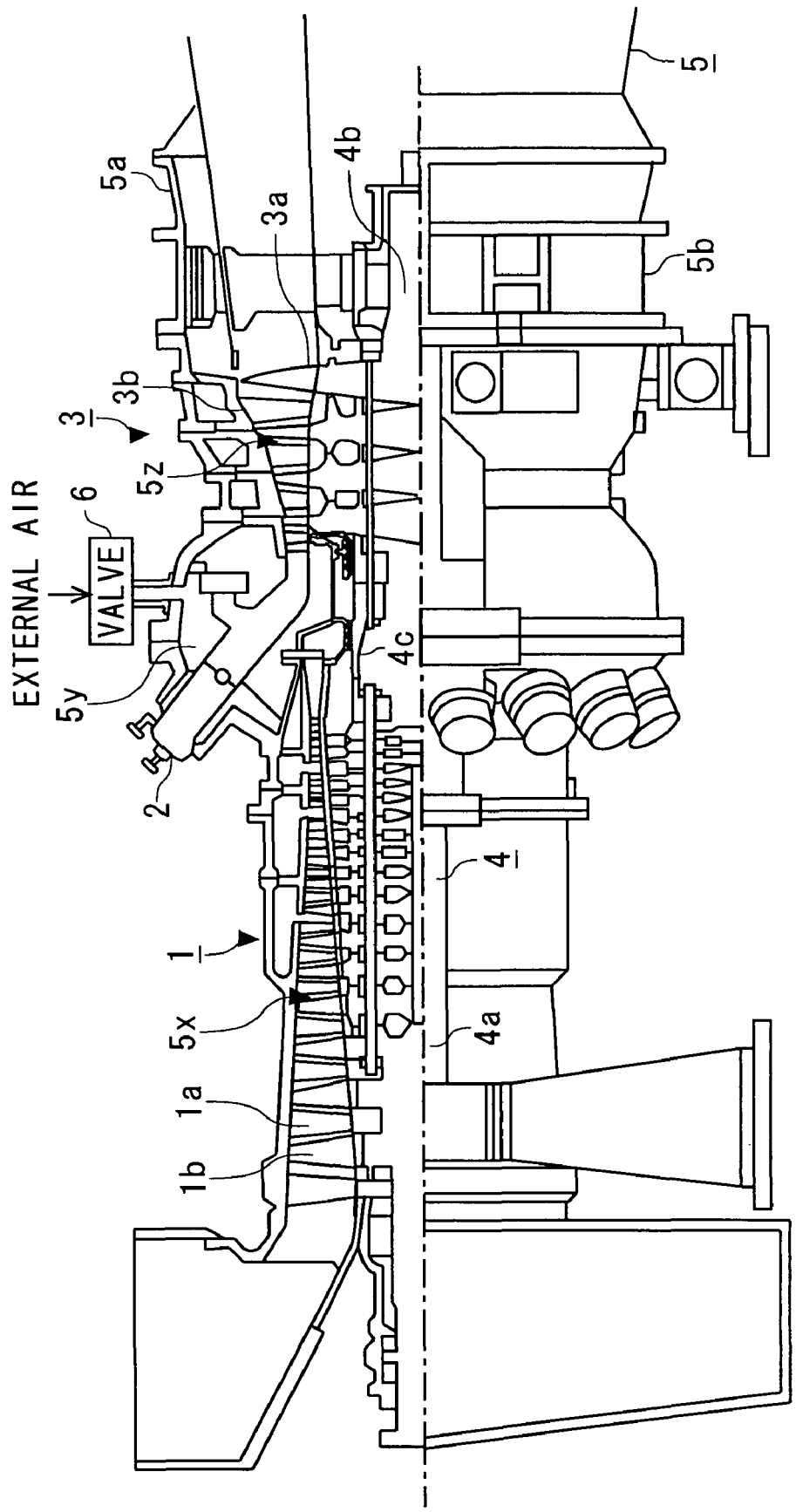
FIG. 1 is a cross-sectional view showing a construction of a gas turbine serving as a basic constitution of each embodiment of the present invention.

Referring now to the drawings, a first embodiment of the present invention will be described hereinafter. FIG. 1 is a cross-sectional view showing a construction of a gas turbine in accordance with the present embodiment.

A gas turbine in FIG. 1 comprises a compressor 1 which compresses the air being sucked from the outside; a combustor 2 which generates combustion gas by being provided with an air compressed by the compressor 1 and a fuel; and a turbine 3 which is rotated by combustion gas being generated in the combustor 2. Then, the gas turbine also comprises a rotor 4 which has rotating blades 1a and 3a provided to the outer circumference thereof; and a casing 5 which has stationary vanes 1b installed alternately with the rotating blades 1a in the axial direction of the rotor 4 and stationary vanes 3b installed alternately with the rotating blades 3a in the axial direction of the rotor 4.

In addition, the rotor 4 comprises a compressor rotor 4a being provided with the rotating blades 1a of the compressor 1; and a turbine rotor 4b being provided with the rotating blades 3a of the turbine 3 that are connected by a torque tube 4c in the vicinity of a position where the combustor 2 is installed. Moreover, the casing 5 comprising an upper casing 5a and a lower casing 5b forms a compressor casing 5x where the rotating blades 1a and the stationary vanes 1b are installed alternatively in the axial direction of the rotor 4; a combustor casing 5y where combustors 2 are provided, being equally spaced in the circumferential direction of the rotor 4; and a turbine casing 5z where the rotating blades 3a and the stationary vanes 3b are installed alternatively in the axial direction of the rotor 4. Then, the upper casing 5a of the casing 5 is provided with a valve 6 for providing the cooling air to the combustor casing 5y and the turbine casing 5z that are high temperature after the operation is stopped.

In a gas turbine being constructed in such a manner as mentioned hereinabove, having the rotating blades 1a rotate in accordance with the revolution of the compressor rotor 4a, the air that is sucked into the inside of the compressor 1 is compressed by being encapsulated in spaces between the rotating blades 1a and the stationary vanes 1b of each stage inside the compressor casing 5x comprising the compressor rotor 4a and the casing 5. Then, the air being compressed in the compressor casing 5x in the compressor 1 flows into the combustor casing 5y so as to be supplied to the combustor 2. The combustor 2 is supplied with a fuel including a fuel gas and performs combustion by using the compressed air from the compressor 1, thereby generating combustion gas. By supplying the high temperature and high pressure combustion gas being generated by the combustor 2 to the turbine casing 5z comprising the turbine rotor 4b and the casing 5, the combustion gas flows into spaces between the rotating blades 3a and the stationary vanes 3b of each stage, thereby rotating the turbine rotor 4b. The revolution of the turbine rotor 4b is transmitted to the compressor rotor 4a by way of the torque tube 4c, which consequently rotates the compressor 4a.

During the operation of a gas turbine, the compressor 1, the combustor 2 and the turbine 3 execute the above-mentioned performance, respectively, which, consequently, generates high temperature and high pressure combustion gas in the combustor 2. As a result, the combustor casing 5y where the combustor 2 is installed and the turbine casing 5z where the high temperature and high pressure combustion gas flows become high temperature. At this time, the combustion gas is generated by having the combustor 2 burn the fuel including the fuel gas, makes the combustor 2 and the like become high temperature, and especially make the interior of the combustor casing 5y become high temperature.

Figure 2:
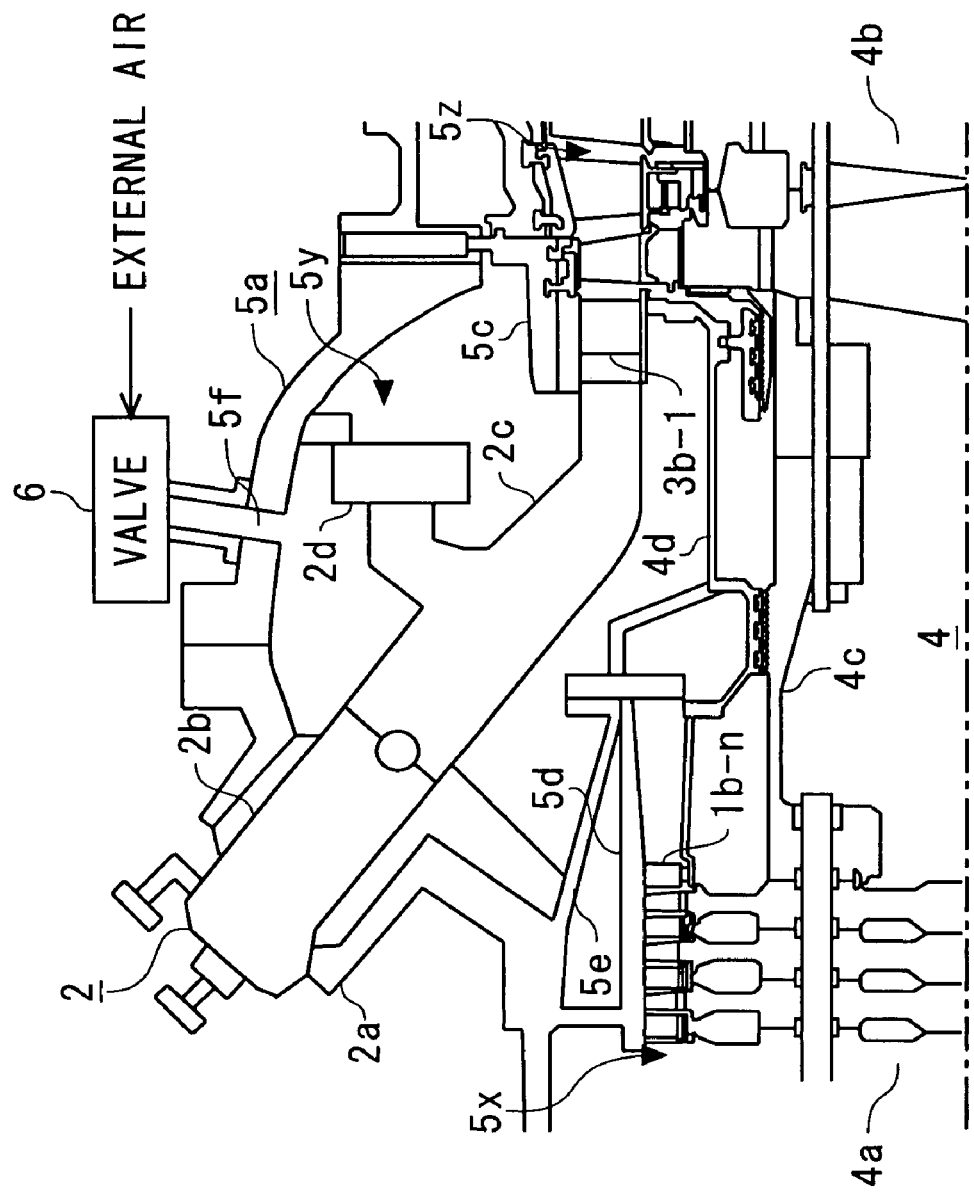
FIG. 2 is a cross-sectional view showing a construction of the periphery of a combustor casing of a gas turbine in accordance with a first embodiment of the present invention.

The details of the construction of the periphery of the combustor casing 5y of the gas turbine as mentioned hereinabove will be described by referring to the drawings. FIG. 2 is a cross-sectional view showing a construction of the periphery of the combustor casing 5y on the side of the upper casing 5a. The "upstream" and the "downstream" hereinafter are based on the direction of the air flow streaming in the compressor 1 and the direction of the combustion gas flow streaming in the turbine 3. As shown in FIG. 2, the combustor 2 comprises an combustor external cylinder 2a being installed to the upper casing 5a; a combustor basket 2b being inserted into the combustor external cylinder 2a so as to be supported; a transition piece 2c being connected to the combustor basket 2b; and a bypass valve 2d being provided to a space between the connection part of the combustor basket 2b and the downstream end of the transition piece 2c.

Additionally, the combustor basket 5y comprises a torque tube cover 4d covering the torque tube 4c of the rotor 4; a bladed ring 5c supporting the first row stationary vanes 3b-1 of the turbine that are installed to the position being adjacent to the combustion gas outlet port at the downstream end of the transition piece 2c of the combustor 2; and the casing 5 in the periphery of the combustor 2. Moreover, the compressor 1 is provided with a bladed ring 5d which supports the last row stationary vanes 1b-n, covering the portion including the vicinity of the compressed air outlet port. Furthermore, a partition 5e in the annular form covering the outer circumference of the bladed ring 5d is provided to the casing 5 of the compressor 1.

When each portion in the periphery of the combustor casing 5y is constructed as mentioned hereinabove, an external air inlet port 5f being connected to the valve 6 is provided to the downstream side of the combustor transition piece 2a of the upper casing 5a in the periphery of the combustor casing 5y. By providing the external air inlet port 5f to the upper casing 5a which forms a part of the combustor casing 5y and at the same time by connecting the valve 6 to the external air inlet port 5f, the external air flows into the combustor casing 5y by way of the valve 6 and the external air inlet port 5f when the valve 6 is opened. In addition, the valve 6 is closed during the operation of the gas turbine, thereby preventing the external air from being introduced into the combustor casing 5y.

Then, when the gas turbine stops the operation by ceasing the combustion of the combustor 2, the valve 6 is opened so as to introduce the external air into the inside of the casing 5. At this time, by ceasing the combustion of the combustor 2 and decreasing the revolution speed of the rotor 4, both temperature and pressure inside the casing 5 decrease and a differential pressure between the interior of the casing 5 and the external air is generated. In consequence, the external air is introduced into the combustor casing 5y on the side of the upper casing 5a by way of the valve 6. In addition, the rotor 4 is rotated at a very slow speed in order to perform the turning operation.

The external air which is introduced into the combustor casing 5y on the side of the upper casing 5a by way of the valve 6 and the external air inlet port 5f in such a manner as mentioned hereinabove is discharged from the downstream end of the transition piece 2c of the combustor 2 after being supplied to the combustor 2 from the combustor basket 2b and the bypass valve 2d. Then, the external air being discharged from the combustor 2 is introduced to the turbine casing 5z which is formed on the side of the upper casing 5a (the turbine casing 5z comprising the upper casing 5a and the turbine rotor 4b) and flows to the exhaust portion on the downstream side so as to be discharged.

By flowing through the combustor casing 5y, the combustor 2 and the turbine casing 5z, respectively, the external air being introduced from the valve 6 and the external air inlet port 5f serves as the cooling air which cools the combustor casing 5y, the combustor 2 and the turbine casing 5z on the side of the upper casing 5a, respectively. In consequence, by flowing through the upper side of the combustor casing 5y and the turbine casing 5z which are heated to high temperature by combustion gas, the external air can cool the upper part of the upper casing 5a on the downstream side of the combustor 2 and the upper part of the turbine rotor 4a, thereby preventing the thermal deformation of the rotor 4 and the casing 5, respectively.

Second Embodiment

Figure 3:
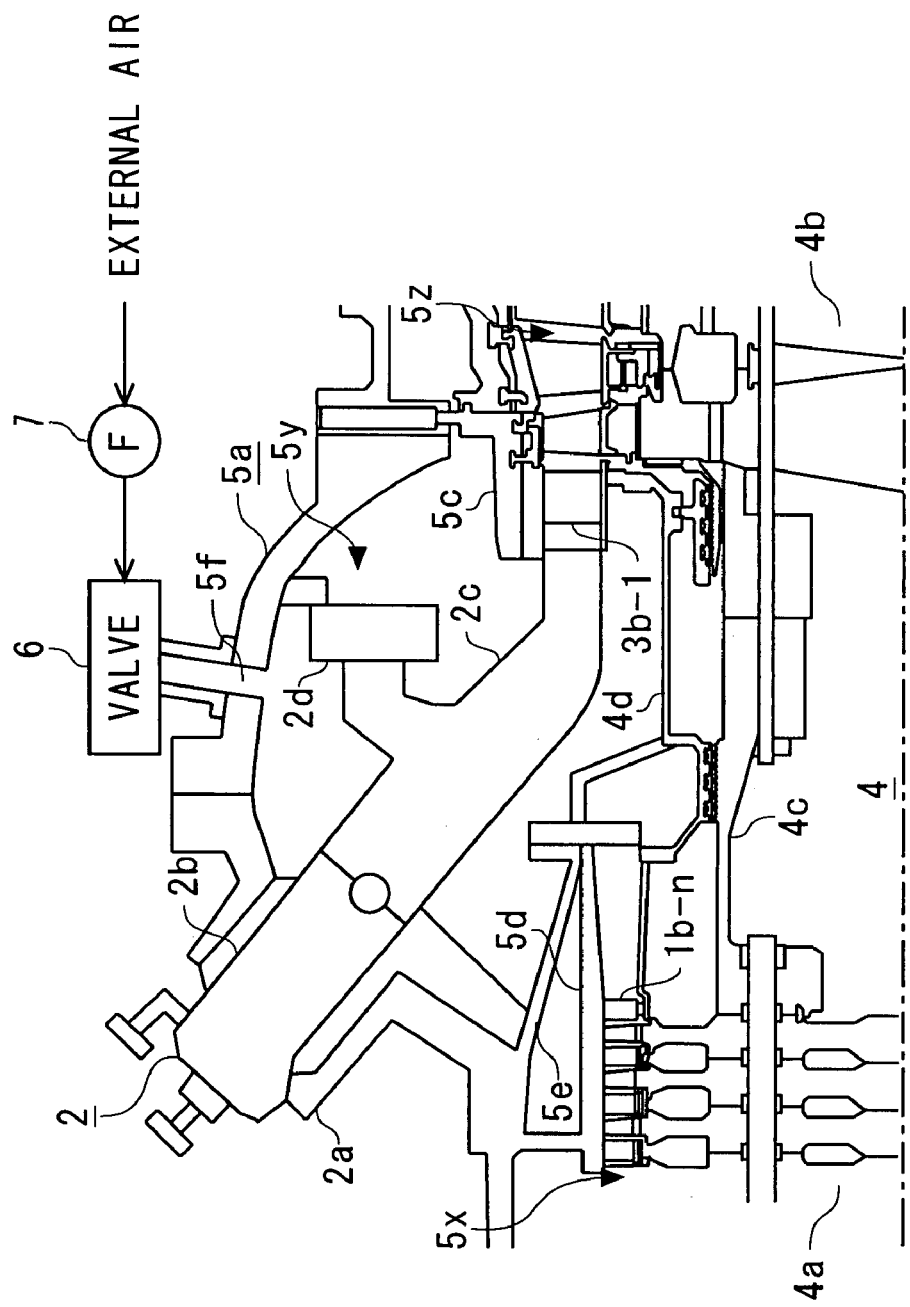
FIG. 3 is a cross-sectional view showing a construction of the periphery of a combustor casing of a gas turbine in accordance with a second embodiment of the present invention

A second embodiment of the present invention will be described by referring to the drawings. Same as the first embodiment, the gas turbine in accordance with the present embodiment has the gas turbine being constructed as in FIG. 1 serve as the basic construction. The gas turbine in accordance with the present embodiment has a different construction for cooling the upper casing 5a from the first embodiment. Therefore, the constituent portion for cooling the upper casing 5a will be described by referring to FIG. 3. In addition, FIG. 3 is a cross-sectional view showing a construction of the periphery of a combustor casing of a gas turbine in accordance with the present embodiment. In addition, in the construction in FIG. 3, the same portions as the construction in FIG. 2 will be supplied with the same symbols and the detailed description thereof will be omitted.

As shown in FIG. 3, same as the first embodiment, the gas turbine in accordance with the present embodiment has a valve 6 connected to the combustor casing 5y so as to introduce the external air; has a blower 7 provided to the exterior thereof, and has an air flow path provided so as to have the air supplied to the external air inlet port 5f from the blower 7 by way of the valve 6. By connecting the blower 7 to the valve 6 in a manner as mentioned hereinabove, the cooling air can be introduced more positively than the first embodiment for cooling the combustor casing 5y, the combustor 2 and the turbine casing 5z on the side of the upper casing 5a, respectively. In addition, because the amount of the air that is introduced by the blower 7 from the external air inlet port 5f by way of the valve 6, serving as the cooling air, can be increased, thereby achieving more effective cooling effects.

In a gas turbine being constructed as mentioned hereinabove, during the operation of the gas turbine, the valve 6 is closed and at the same time the blower 7 is stopped from operating, which prevents the cooling air from being supplied from the external air inlet port 5f. Then, when the operation of the gas turbine is stopped by ceasing the combustion of the combustor 2, the valve 6 is opened and at the same time, the blower 7 is started operating. As a result, more external air is introduced into the interior of the casing 5 through the valve 6 by the blower 7. At this time, the rotor 4 is rotated at a very slow speed in order to perform the turning operation. Same as the first embodiment, the external air being introduced to the combustor casing 5y on the side of the upper casing 5a by way of the valve 6 and the external air inlet port 5f by the blower 7 is introduced to the combustor casing 5y, the combustor 2 and the turbine casing 5z, respectively, flows to the exhaust portion on the downstream side and is discharged.

As mentioned hereinabove, in accordance with the present embodiment, by providing a blower 7, a larger volume of the air is introduced into the interior of the casing 5 than the gas turbine in accordance with the first embodiment, thereby enhancing the cooling effect thereof. In addition, in this embodiment, more cooling air is supplied to the interior of the casing 5 by connecting the blower 7 to the valve 6. However, the compressed cooling air may be introduced from the external air inlet port 5f by way of the valve 6 by connecting an air compressor to the valve 6 instead of the blower 7.

Third Embodiment

Figure 4:
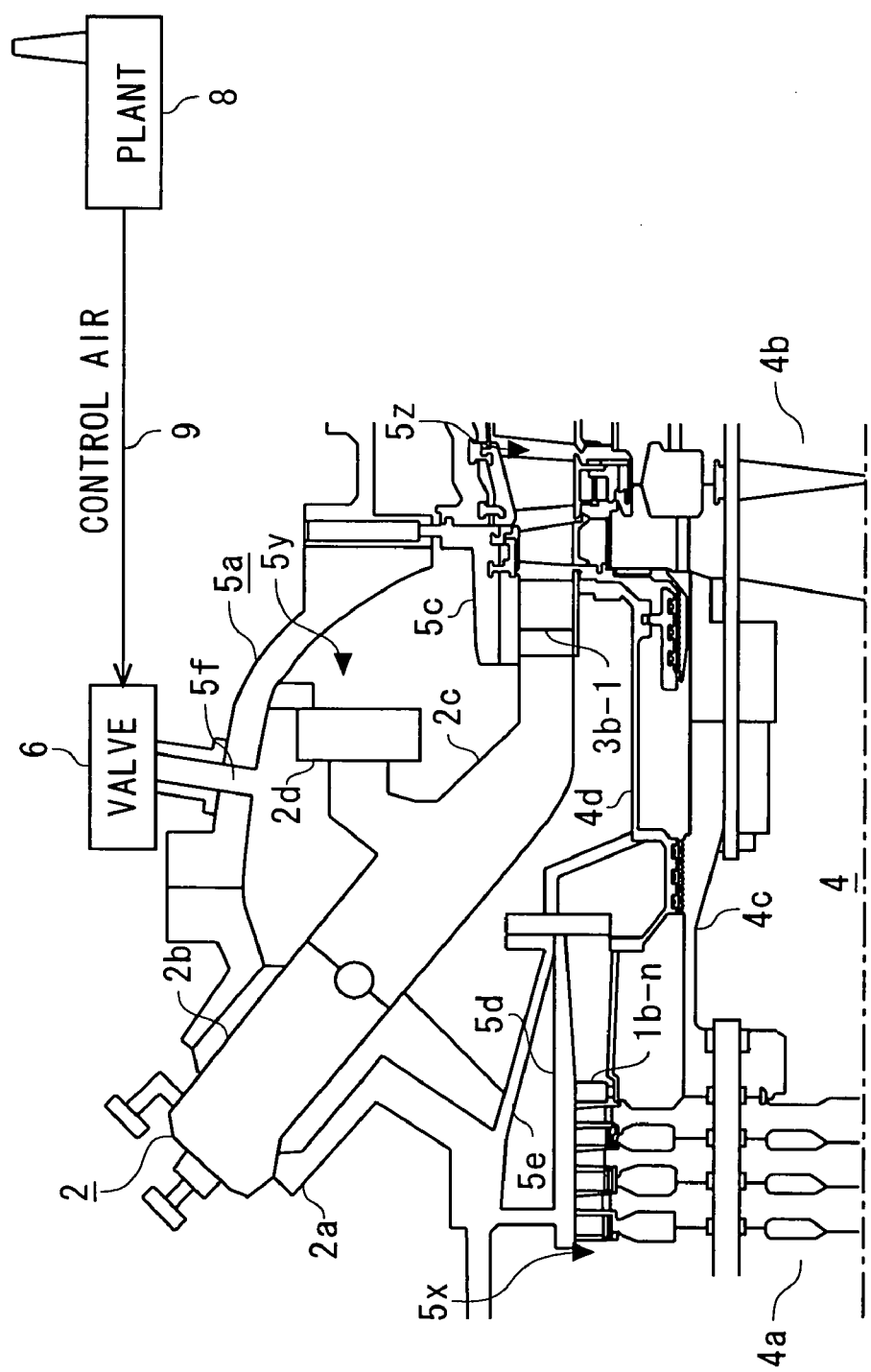
FIG. 4 is a cross-sectional view showing a construction of the periphery of a combustor casing of a gas turbine in accordance with a third embodiment of the present invention.

A third embodiment of the present invention will be described by referring to the drawings. Same as the first embodiment, the gas turbine in accordance with the present embodiment has the gas turbine being constructed as in FIG. 1 serve as the basic construction. However, the gas turbine in accordance with the present embodiment is different from the first embodiment in the construction for cooling the upper casing 5a. Therefore, constituent portion for cooling the upper casing 5a will be described by referring to FIG. 4. In addition, FIG. 4 is a cross-sectional view showing a construction of the periphery of a combustor casing of a gas turbine in accordance with the present embodiment. In addition, in the construction in FIG. 4, the same portions as the construction in FIG. 2 will be supplied with the same symbols and the detailed description thereof will be omitted.

As shown in FIG. 4, when the gas turbine in accordance with the present embodiment has a valve 6 connected to the combustor casing 5y so as to introduce the external air in the same manner as the first embodiment, an air flow path 9 is formed therein so that the control air being used for another plant 8 such as a steam turbine and the like will be supplied to the external air inlet port 5f by way of the valve 6. To be specific, a part of the control air being used for the plant 8 is diverged so as to flow to the valve 6 by way of the air flow path 9, and at the same time, the control air is introduced from the external air inlet port 5f so as to serve as the cooling air in the upper casing 5a.

In a gas turbine being constructed as mentioned hereinabove, during the operation of the gas turbine, the valve 6 is closed, so that the cooling air is prevented from being supplied from the external air inlet port 5f. Then, when the operation of the gas turbine is stopped by ceasing the combustion of the combustor 2, by opening the valve 6, a part of the control air in the plant 8 is introduced into the interior of the casing 5 through the air flow path 9 and the valve 6. At this time, the rotor 4 is rotated at a very slow speed in order to perform the turning operation. Same as the first embodiment, the control air being introduced from the plant 8 to the combustor casing 5y on the side of the upper casing 5a by way of the air flow path 9, the valve 6 and the external air inlet port 5f is introduced to the combustor casing 5y, the combustor 2 and the turbine casing 5z, respectively, and flows to the exhaust portion on the downstream side and is discharged.

As mentioned hereinabove, in accordance with the present embodiment, because the control air in the plant 8 is introduced into the interior of the casing 5, a larger volume of the air can be introduced into the interior of the casing 5 than the gas turbine in accordance with the first embodiment, thereby enhancing the cooling effect thereof. In addition, because the control air in the plant 8 is used, it is not necessary to install a blower or an air compressor as the second embodiment.

Moreover, in the first through the third embodiments, the external air inlet port 5f is provided to the combustor casing 5y. However, the external air inlet port 5f may be installed not only to the combustor casing 5y but also to the turbine casing 5z on the side of the upper casing 5a. Additionally, when the external air inlet port 5f is provided to the combustor casing 5y and the turbine casing 5z on the side of the upper casing 5a, a plurality of external air inlet ports 5f may be provided to the side of the upper casing 5a.

Fourth Embodiment

A fourth embodiment of the present invention will be described by referring to the drawings. Same as the first embodiment, the gas turbine in accordance with the present embodiment has the gas turbine being constructed as in FIG. 1 serve as the basic construction. The gas turbine in accordance with the present embodiment has a different construction of an external air inlet port provided to the upper casing 5a from the first through the third embodiments. Therefore, the construction of the external air inlet port will be described by referring to FIG. 5. In addition, FIG. 5 is a cross-sectional view showing the construction of the external air inlet port being provided to the gas turbine in accordance with the present embodiment.

Figure 5:
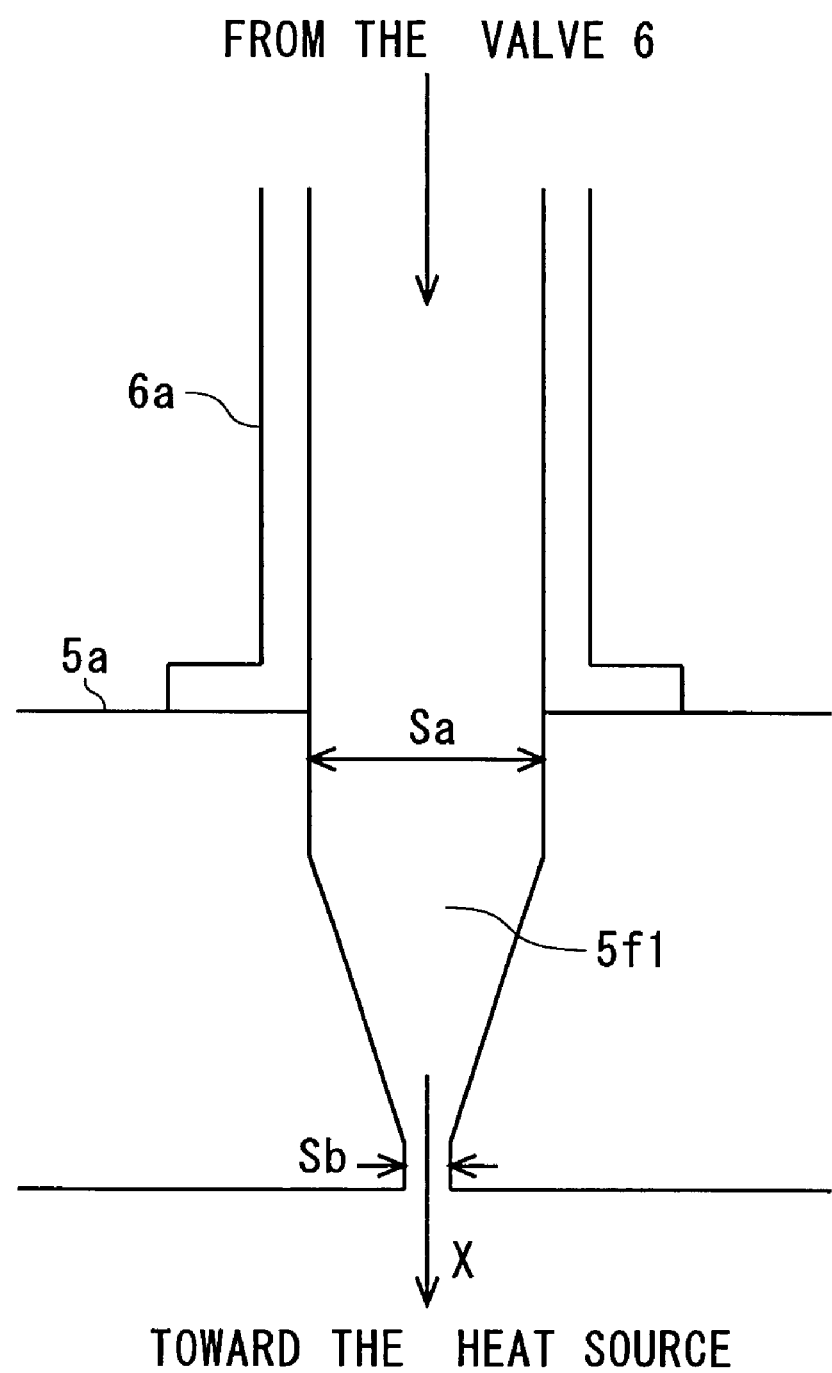
FIG. 5 is a cross-sectional view showing a construction of an external air inlet port of a gas turbine in accordance with a fourth embodiment of the present invention.

As shown in the cross-sectional view of FIG. 5, the external air inlet port 5/1 being provided to the gas turbine in accordance with the present invention is constructed so as to have the opening area S$b$ on the side of the inside wall of the upper casing 5a become smaller than the opening area S$a$ on the side of the outside wall of the upper casing 5a being connected to the external air supply passageway 6a which is connected to the valve 6 to supply the air. To be specific, the external air inlet port 5/1 is formed in a shape of a nozzle that is tapered toward the inside of the casing 5a. By constructing the external air inlet port 5/1 in a manner as mentioned hereinabove, the flow rate of the air being supplied to the external air inlet port 5/1 by way of the valve 6 and the external air supply passageway 6a can be accelerated.

At this time, the axial direction "X" of the nozzle-shaped portion constructing the external air inlet port 5/1 is set to be the same direction as the direction viewed from the external air inlet port 5/1 to the portion which serves as a heat source when the gas turbine is shut down. Therefore, the cooling air being introduced by way of the external air inlet port 5/1 can reach the portion of high temperature serving as a heat source when the gas turbine is shut down. By providing the external air inlet port 5/1 to the side of the upper casing 5a of the combustor casing 5y, the cooling air can reach the combustor 2, the torque tube cover 4d and the bladed ring 5c of the first-row stationary vanes 3b-1 of the turbine that serve as a heat source. (See FIG. 2.) As a result, it is possible to shorten the cooling time of the combustor 2, the torque tube cover 4 and the bladed ring 5c that serve as a heat source, which can shorten the cooling time in the upper half of the interior of the casing 5. Consequently, each of the temperature difference of the upper casing 5a and the lower casing 5b can be decreased respectively, thereby restraining the thermal deformation of the casing 5.

Figure 6:
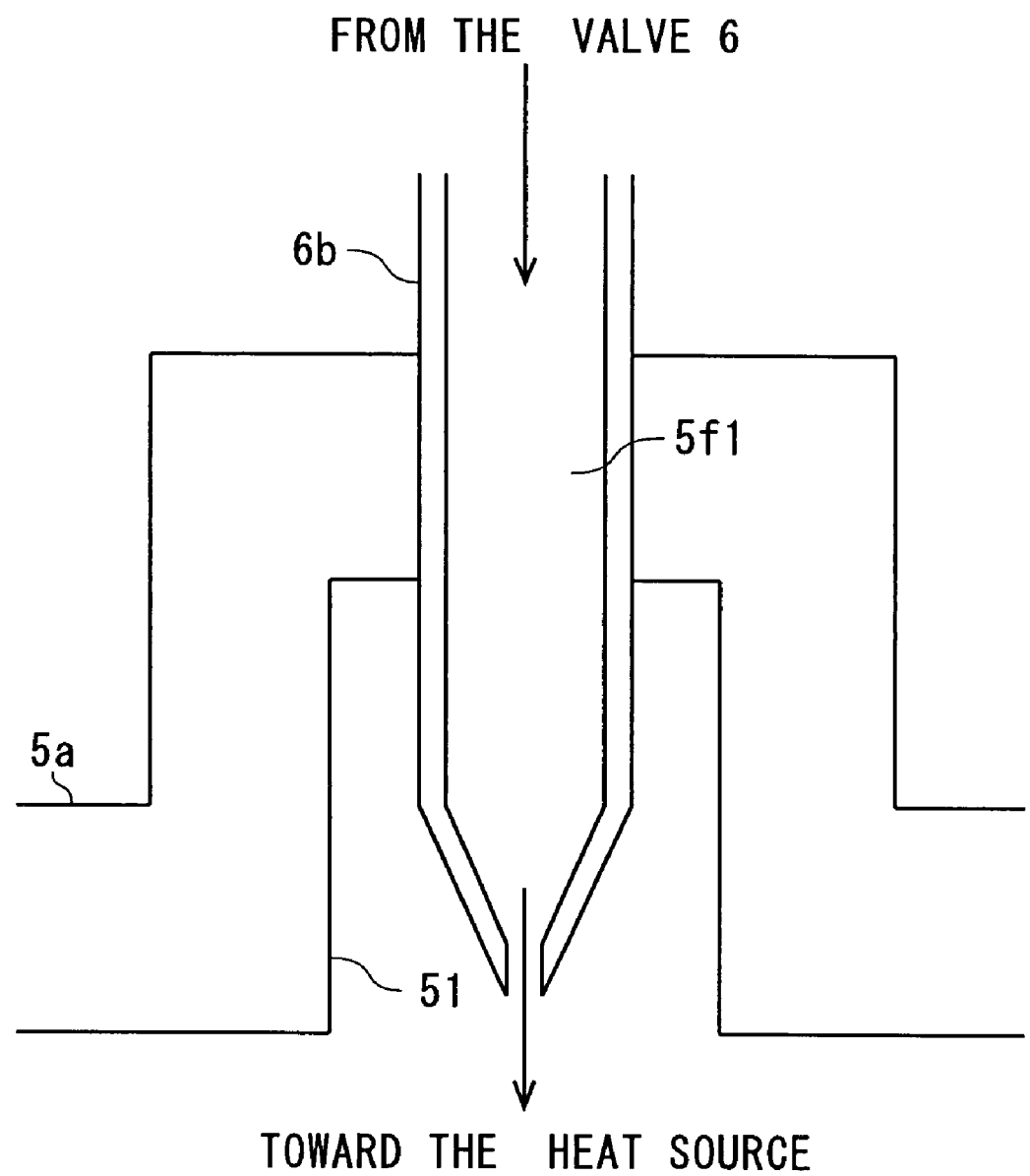
FIG. 6 is a cross-sectional view showing another construction of an external air inlet port of a gas turbine in accordance with a fourth embodiment of the present invention

In addition, the external air inlet port 5/1 in accordance with the present embodiment is shaped as shown in the cross-sectional view of FIG. 5. However, the external air inlet port 5/1 may have another shape as long as the edge is tapered toward the inside of the casing 5 so as to have a shape of a nozzle. Therefore, for example, as shown in the cross-sectional view in FIG. 6, by having the portion of the upper casing 5a where the external air inlet port 5/1 is provided protrude to the outside of the casing 5a, a concave portion 51 may be formed in the inside wall of the upper casing 5a and in addition, an external air supply passageway 6b having an edge thereof shaped in a nozzle may be inserted so as to be housed in the concave portion 51.

To be specific, by providing the edge of the external air supply passageway 6b in a manner that the edge of the external air supply passageway 6b is located outside of the inside wall of the upper casing 5a, the flow of the fluid streaming inside the casing 5 can be prevented from being disturbed during the gas turbine operation. At this time, by providing the external air supply passageway 6b in a manner that the edge of the external air supply passageway 6b faces toward a heat source, the flow rate of the external air being supplied from the external air supply passageway 6b shaped in a nozzle by having the edge thereof narrowed is increased, thereby reaching the heat source.

Fifth Embodiment

A fifth embodiment of the present invention will be described by referring to the drawings. Same as the first embodiment, the gas turbine in accordance with the present embodiment has the gas turbine being constructed as in FIG. 1 serve as the basic construction. The gas turbine in accordance with the present embodiment has an external air inlet port provided to the upper casing 5a in a different manner from the fourth embodiment. Therefore, the construction of the external air inlet port will be described by referring to FIG. 7. In addition, FIG. 7 is a cross-sectional view showing the construction of the external air inlet port of the gas turbine in accordance with the present embodiment.

Figure 7:
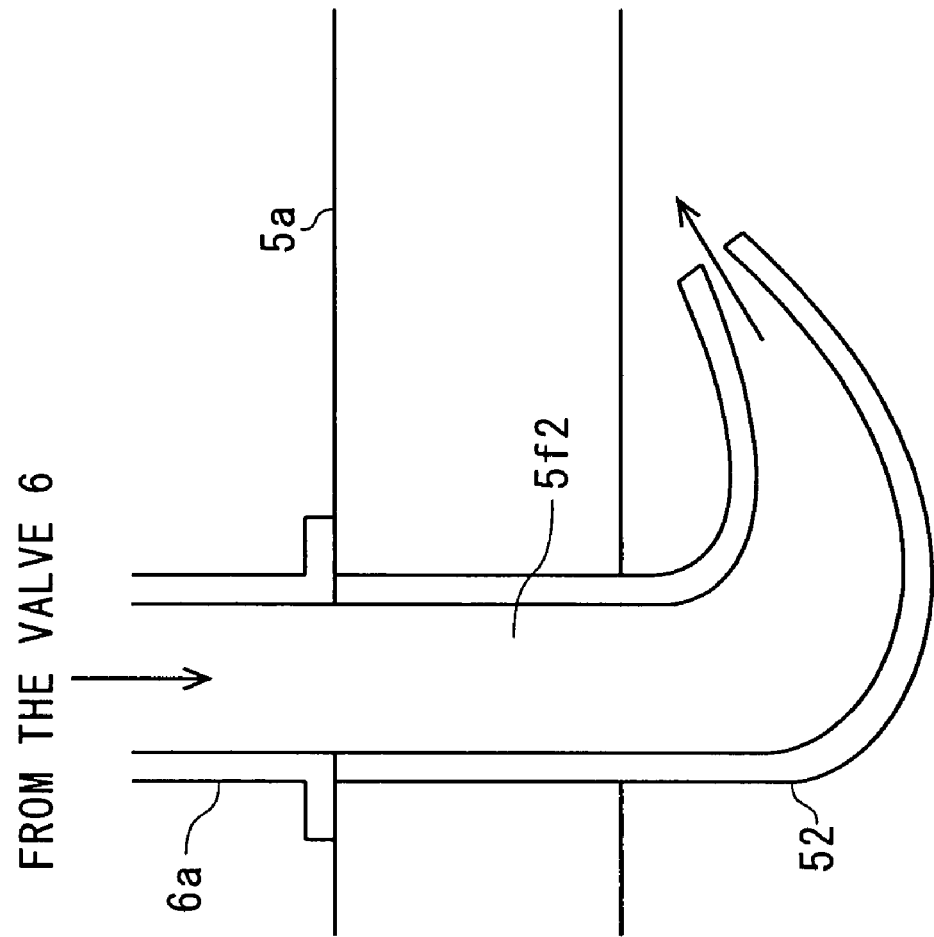
FIG. 7 is a cross-sectional view showing a construction of an external air inlet port of a gas turbine in accordance with a fifth embodiment of the present invention.

As shown in the cross-sectional view of FIG. 7, the external air inlet port 5/2 being provided to the gas turbine in accordance with the present embodiment is connected to the external air supply passageway 6a being connected to the valve 6 and supplying the air, and at the same time, has a nozzle 52 inserted therein, whose edge faces toward the inside wall surface of the upper casing 5a. As shown in FIG. 7, the tip of the nozzle 52 being inserted into the external air inlet port 5/2 protrudes to the inner side than the inside wall of the upper casing 5a and then bends. By being constructed in a manner as mentioned hereinabove, the external air being supplied to the nozzle 52 by way of the valve 6 and the external air supply passageway 6a is injected toward the inside wall surface of the upper casing 5a from the tip of the nozzle 52.

Because the external air being injected from the nozzle 52 flows along the inside wall surface of the upper casing 5a as mentioned hereinabove, the heat transfer ratio of the cooling air versus the inside wall surface of the upper casing 5a can be increased, thereby decreasing the volume of the external air being introduced into the inside of the casing 5 by way of the valve 6.

Additionally, when such a nozzle 52 as mentioned hereinabove is constructed so as to be inserted into the external air inlet port 5/2, the nozzle 52 may be provided to any of the compressor casing 5x, the combustor casing 5y and the turbine casing 5z of the upper casing 5a. Here, when the upper casing 5a composing the compressor 5x is provided with a construction that a nozzle 52 is inserted into the external air inlet port 5/2, the volume of the air being introduced to the external air inlet port 5/2 can be decreased. Therefore, the temperature difference between the upper casing 5a and the lower casing 5b can be reduced by cooling the upper casing 5a without cooling the interior of the compressor casing 5x. In consequence, the casing 5 can be prevented from contacting the compressor rotor 4a in the compressor casing 5x, and the thermal deformation of the casing 5 can be restrained.

Figure 8:
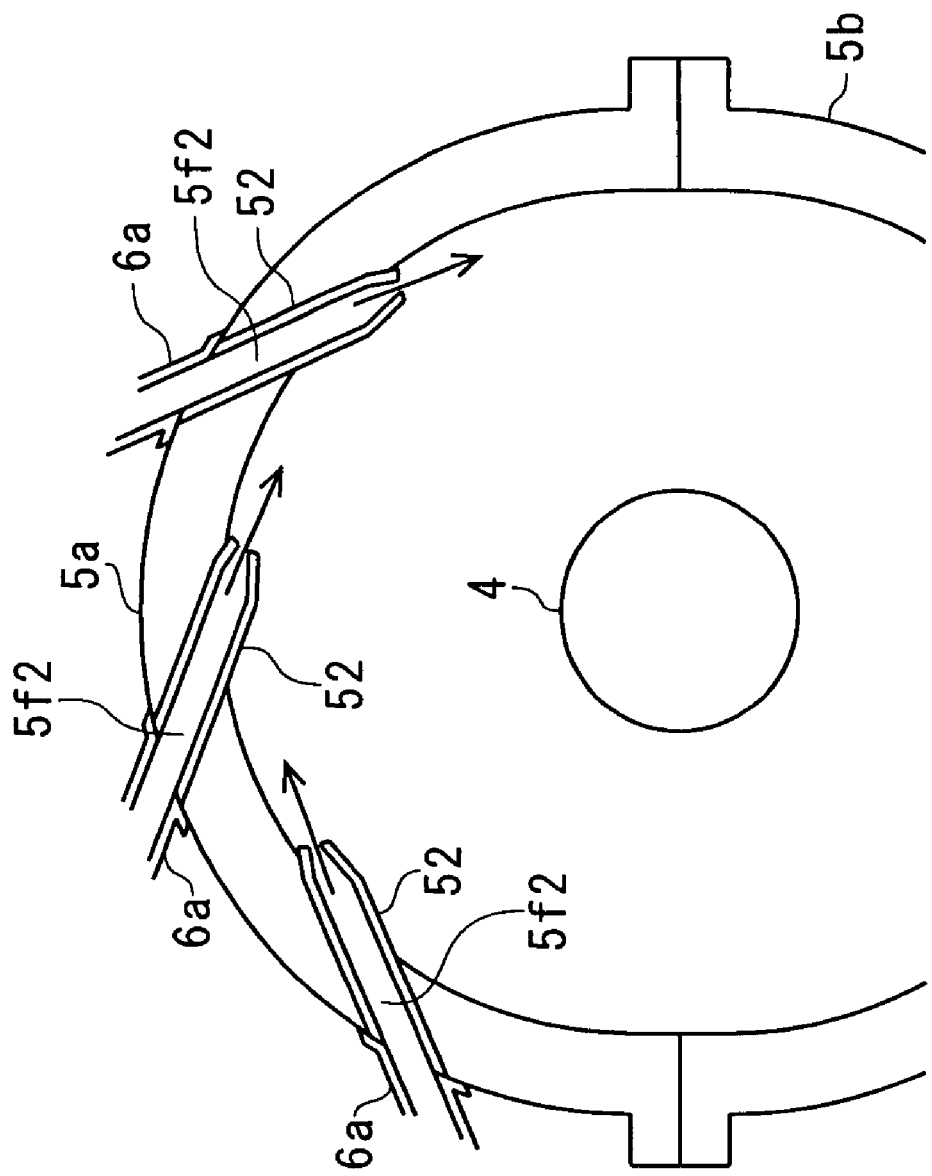
FIG. 8 is a cross-sectional view showing another construction of an external air inlet port of a gas turbine in accordance with a fifth embodiment of the present invention.

As mentioned hereinabove, in the present embodiment, the cooling air is injected to the inside wall surface of the upper casing 5a by bending the nozzle 52 being inserted into the external air inlet port 5/2. However, as shown in FIG. 8, the external air inlet port 5/2 may be formed in the rotating direction (in the tangential direction) in the upper casing 5a, wherein the nozzle 52 may be inserted into the external air inlet port 5/2. To be specific, the external air inlet port 5/2 is formed in a hole being supplied with a predetermined inclination to the radial direction of the upper casing 5a, wherein the nozzle 52 is inserted into the external air inlet port 5/2. By being constructed in such a manner as mentioned hereinabove, same as the case where the nozzle 52 is bent, the cooling air can be injected to the inside wall surface of the upper casing 5a from the nozzle 52. In addition, FIG. 8 is a cross-sectional view of a plane surface of the upper casing 5a being vertical to the axial direction of the rotor 4.

Moreover, the nozzle 52 being provided in the present embodiment may be formed in the same manner as the fourth embodiment so as to have the tip thereof tapered, thereby accelerating the flow rate of the cooling air being injected to the inside wall surface of the upper casing 5a.

Sixth Embodiment

A sixth embodiment of the present invention will be described by referring to the drawings. Same as the first embodiment, the gas turbine in accordance with the present embodiment has the gas turbine being constructed as in FIG. 1 serve as the basic construction. The gas turbine in accordance with the present embodiment has an external air inlet port provided to the upper casing 5a in a different manner from the fourth or the fifth embodiment. Therefore, the construction of the external air inlet port will be described by referring to FIG. 9. In addition, FIG. 9 is a cross-sectional view showing the construction of the external air inlet port of the gas turbine in accordance with the present embodiment.

Figure 9:
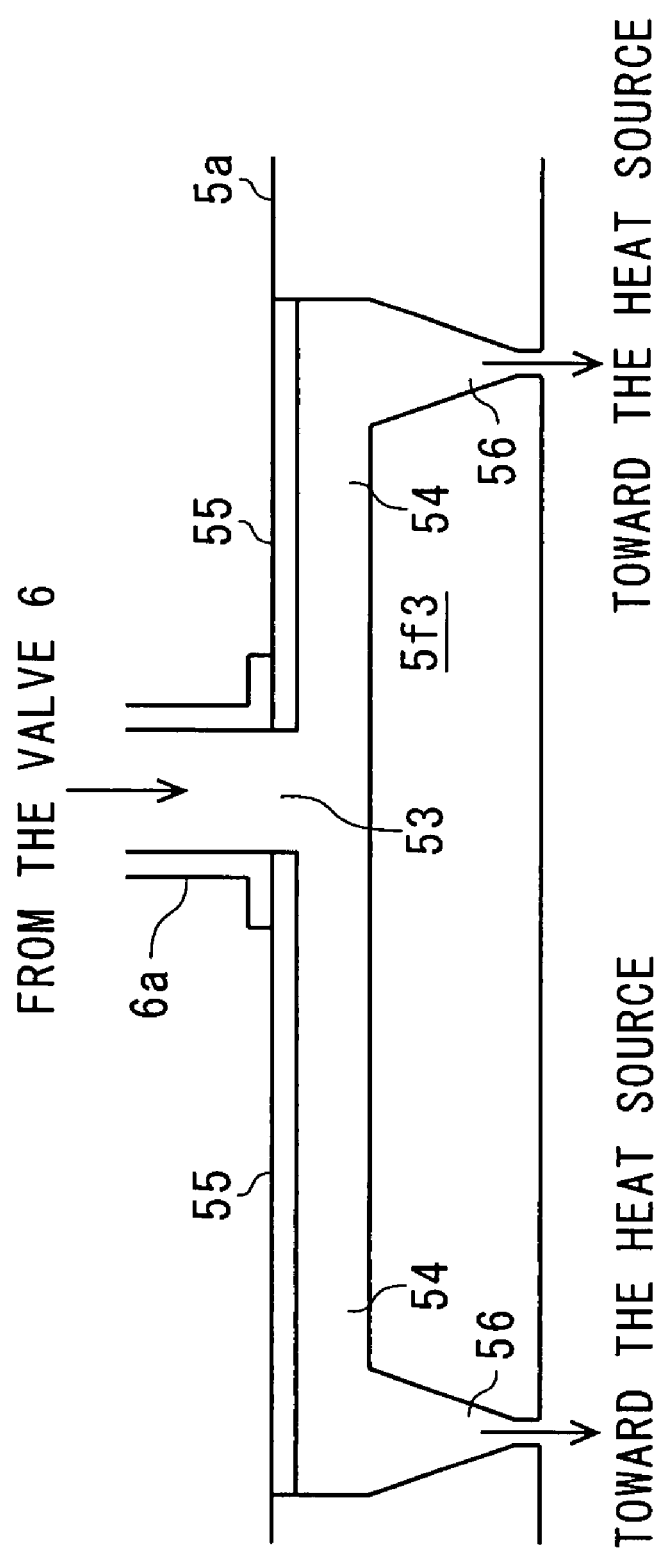
FIG. 9 is a cross-sectional view showing a construction of an external air inlet port of a gas turbine in accordance with a sixth embodiment of the present invention.

As shown in FIG. 9, the external air inlet port 5f3 being provided to the gas turbine in accordance with the present embodiment comprises an external air supply port 53 which is connected to the external air supply passageway 6a on the outside wall of the upper casing 5a; an external air-introduction slot 54 which is connected to the external air supply port 53 and provided to the outside wall of the upper casing 5a; an external air-introduction slot cover 55 which covers the upper part of the external air-introduction slot 54 (the outside wall of the upper casing 5a); and an external air inlet port 56 which is connected to the external air-introduction slot 54 and provided to the inside wall of the upper casing 5a. In addition, in FIG. 8, a plurality of external air-introduction slots 54 are diverged from an external air supply port 53 and a plurality of external air inlet ports 56 are provided to the inside wall of the upper casing 5a.

By being constructed in a manner as mentioned hereinabove, when the external air is supplied to the external air inlet port 5f3 by way of the valve 6 and the external air supply passageway 6a, the air being supplied to the external air supply port 53 flows through the external air-introduction slots 54 being provided to the outside wall of the upper casing 5a, thereby cooling the upper casing 5a. The cooling air flowing through the external air-introduction slots 54 can reduce each of the temperature differences of the upper casing 5a and the lower casing 5b, respectively. Then, the air flowing through the external air-introduction slots 54 is introduced to the inside of the upper casing 5a from the external air inlet ports 56 being connected to the external air-introduction slots 54. The air being introduced from the external air inlet ports 56 serve as the cooling air which cools the upper half of the casing interior being formed by the casing 5.

Then, by providing the external air inlet ports 56 to the vicinity of the combustor 2 serving as the heat source, the torque tube cover 4d, the bladed ring 5c of the first-row stationary vanes 3b-1 of the turbine (See FIG. 2.) and the like, the cooling air can reach the combustor 2 serving as the heat source, the torque tube cover 4 and the bladed ring 5c. In consequence, the cooling time of the combustor 2 serving as the heat source, the torque tube cover 4 and the bladed ring 5c can be shortened, which can further shorten the cooling time of the upper half of the interior of the casing 5, thereby preventing the thermal deformation of the casing 5.

Figure 10:
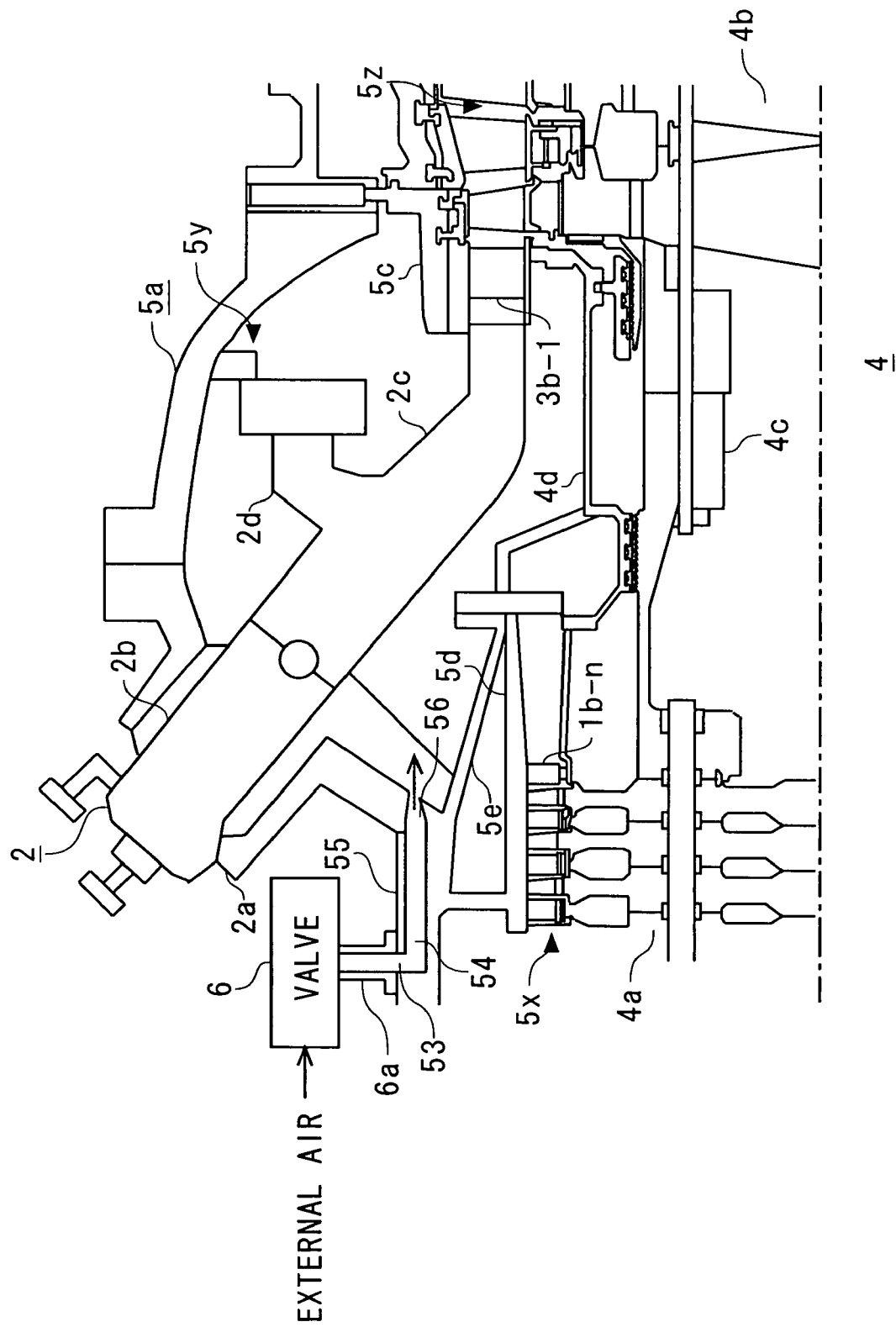
FIG. 10 is a cross-sectional view showing a construction of the periphery of a combustor casing, having an external air inlet port provided to a compressor casing of a gas turbine in accordance with a sixth embodiment of the present invention.

In addition, when the external air inlet port 5f3 being constructed as mentioned hereinabove is provided to the upper casing 5a composing the compressor casing 5x, as shown in FIG. 10, the external air inlet port 56 is provided to the inside wall of the upper casing 5a in the combustor casing 5y. To be specific, the external air supply port 53 is provided to the upper casing 5a composing the compressor casing 5x and is connected to the external air supply passageway 6a, and additionally, the external air-introduction slot 54 having the upper part thereof covered by the external air-introduction slot cover 55 is formed toward the combustor casing 5y from the external air supply port 53. To say specifically, the upper casing 5a being located on the outer circumference of the partition 5e is provided with the port connected to the external air supply port 53, the external air-introduction slot 54 and external air-introduction slot cover 55. Then, the external air inlet port 56 is provided to the inside wall surface on the side of the compressor 1 of the upper casing 5a composing the combustor casing 5y.

By providing the external air inlet ports 5f3 to the compressor casing 5x in such a manner as mentioned hereinabove, the upper casing 5a of the compressor casing 5x is cooled by the external air streaming through the external air-introduction slots 54, which can restrain the temperature difference between the upper casing 5a and the lower casing 5b that construct the compressor casing 5x, thereby preventing the thermal deformation of the casing 5. At this time, the temperature inside the compressor casing 5x is lower than the temperature inside the combustor casing 5y and the turbine casing 5z. Therefore, when the cooling air is introduced, the interior of the compressor casing 5x is cooled, which has a possibility that the casing 5 constructing the compressor casing 5x may have a contact with the compressor rotor 4a. In consequence, by providing the external air inlet ports 56 to the upper casing 5a constructing the combustor casing 5y, the cooling air streaming through the external air-introduction slots 54 is introduced to the combustor casing 5y, thereby preventing the cooling of the compressor casing 5x from being promoted.

The construction in the periphery of the external air inlet port in accordance with the fourth through the sixth embodiments can be applied to the gas turbine in accordance with the first through the third embodiments. In addition, in the sixth embodiment, the construction of the external air inlet ports 56 may be constructed so as to have such a shape of a nozzle as in the fourth or the fifth embodiment.

Seventh Embodiment

Figure 11:
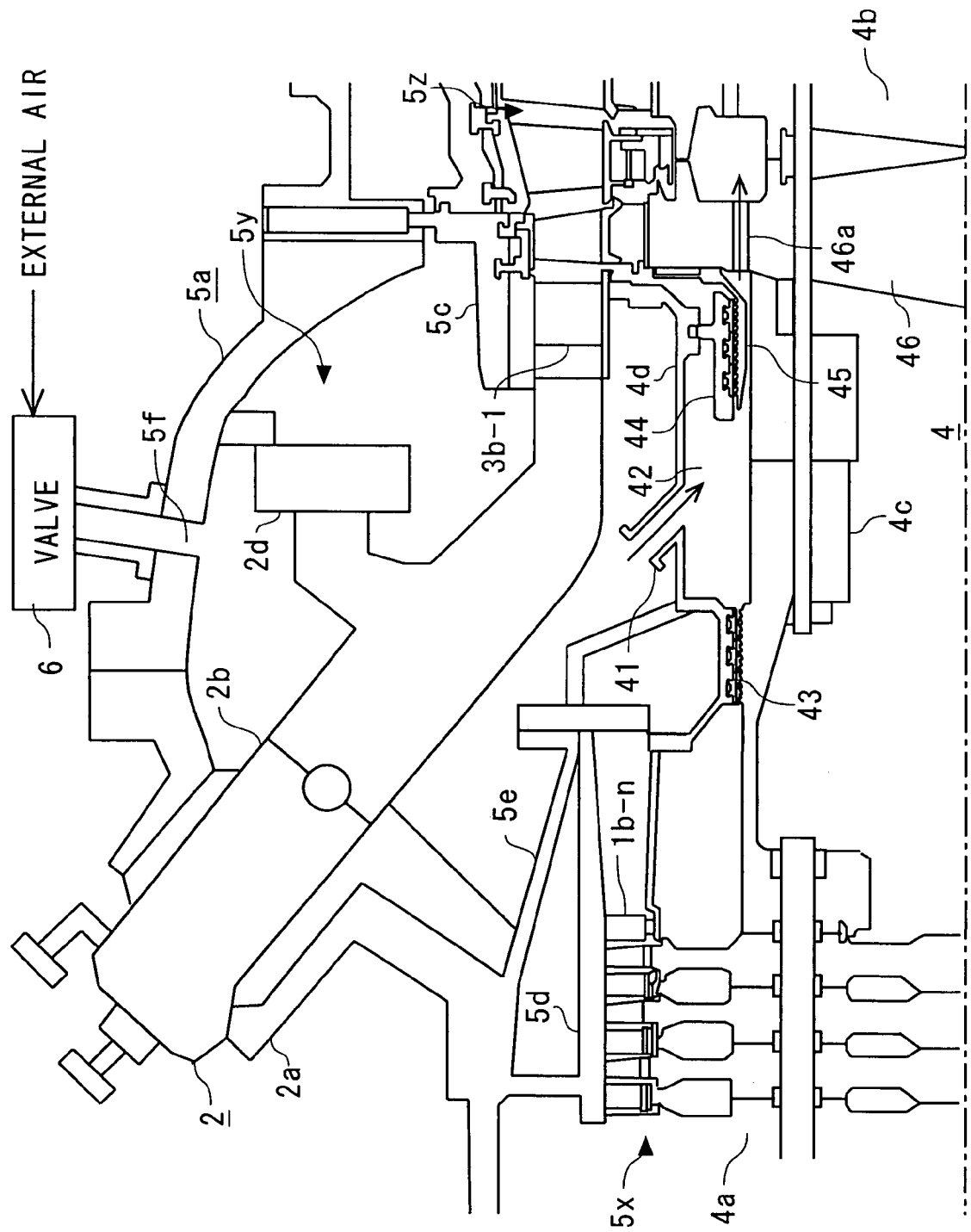
FIG. 11 is a cross-sectional view showing a construction of a periphery of a combustor casing of a gas turbine in accordance with a seventh embodiment of the present invention.

A seventh embodiment of the present invention will be described by referring to the drawings. Same as the first embodiment, the gas turbine in accordance with the present embodiment has the gas turbine being constructed as in FIG. 1 serve as the basic construction. The gas turbine in accordance with the present embodiment has a cooling air supply pipe supplying the cooling air to the rotor interior installed to the interior of the combustor casing where the external air inlet port is provided in accordance with each of the embodiments being described hereinabove. Therefore, the construction of the periphery of the cooling air supply pipe will be described by referring to FIG. 11. In addition, FIG. 11 is a cross-sectional view showing a construction of the periphery of the combustor casing of the gas turbine in accordance with the present embodiment. In the construction in FIG. 11, the same portions as the construction in FIG. 2 will be supplied with the same symbols and the detailed description thereof will be omitted.

As shown in FIG. 11, same as the first embodiment, the gas turbine in accordance with the present embodiment has an external air inlet port 5f provided to the upper casing 5a constructing the combustor casing 5y, and at the same time, has a valve 6 connected to the external air inlet port 5f so as to have the external air introduced to the combustor casing 5y. Furthermore, a cooling air supply pipe 41 is provided to the torque tube cover 4d for supplying the external air being introduced into the combustor casing 5y to the interior of the rotor 4 as the cooling air. The cooling air supply pipe 41 is installed to the torque tube cover 4d on the side of the upper casing 5a. Therefore, the external air being introduced to the upper half of the combustor casing 5y from the external air inlet port 5f as the cooling air is supplied to the upper part of the torque tube 4c of the rotor 4 by way of the cooling air supply pipe 41.

The cooling air being supplied from the cooling air supply pipe 41 in such a manner as mentioned hereinabove is introduced to a cooling air chamber 42 in an annular shape which is formed between the torque tube 4c and the torque tube cover 4d. Both ends of the torque tube 4c have labyrinth seals 43 and 44 provided thereto in order to prevent the cooling air being introduced into the cooling air chamber 42 from leaking to the outside of the torque tube cover 4d. In addition, the labyrinth seal 43 is provided to the end of the connection to the compressor rotor 4a, while the labyrinth seal 44 is provided to the end of the connection to the turbine rotor 4b, thereby preventing the cooling air from leaking from the space between the rotor 4 and the torque tube cover 4d.

Additionally, in order to have the cooling air being introduced to the cooling air chamber 42 flow to the turbine rotor 4b, an air flow path 45 is provided between the labyrinth seal 44 and the torque tube 4c. Then, when the cooling air flowing through the air flow path 45 is supplied to the disk 46 where the rotating blades 3a constituting the turbine rotor 4b are provided, the cooling air flows into the air flow path 46a in an annular shape that is provided to the disk 46, thereby cooling the interior of the rotor 4b. In addition, the cooling air being introduced to the cooling air chamber 42 flows between the torque tube cover 4d and the disk 46, and at the same time, the cooling air being supplied to the air flow path 46a of each disk 46 constituting the turbine rotor 4b flows between each of the disks 46, thereby cooling the areas from the rotor 4b to the stationary vanes 3a and the rotating blades 3b.

As mentioned hereinabove, in the present embodiment, the cooling air being introduced to the combustor casing 5y can be flowed to the interior of the turbine rotor 4b by way of the cooling air supply pipe 41 which is provided to the torque tube cover 4d in the combustor casing 5y on the side of the upper casing 5a. In consequence, the cooling speed of the rotor 4 can be accelerated, which can cool the casing interior being constructed by the casing 5 uniformly, thereby restraining the increase in thermal deformation of the casing 5.

In addition, the present embodiment may be provided with the construction of the first through the third embodiments when the external air inlet port is provided to the upper casing 5a that constructs the combustor casing 5y. Furthermore, the external air inlet ports 5f1 through 5f3 being constructed in accordance with the fourth through the sixth embodiments may be provided instead of the external air inlet port 5f.

Eighth Embodiment

An eighth embodiment of the present invention will be described by referring to the drawings. Same as the first embodiment, the gas turbine in accordance with the present embodiment has the gas turbine being constructed as in FIG. 1 serve as the basic construction. Being different from each of the above-mentioned embodiments, the gas turbine in accordance with the present embodiment has a cover installed thereto so as to cover the outside of the upper casing. Therefore, the construction of the cover covering the outside of the upper casing will be described by referring to FIG. 12. In addition, FIG. 12 is a cross-sectional view showing a construction of the cover covering the upper casing which is used for the gas turbine in accordance with the present embodiment.

Figure 12:
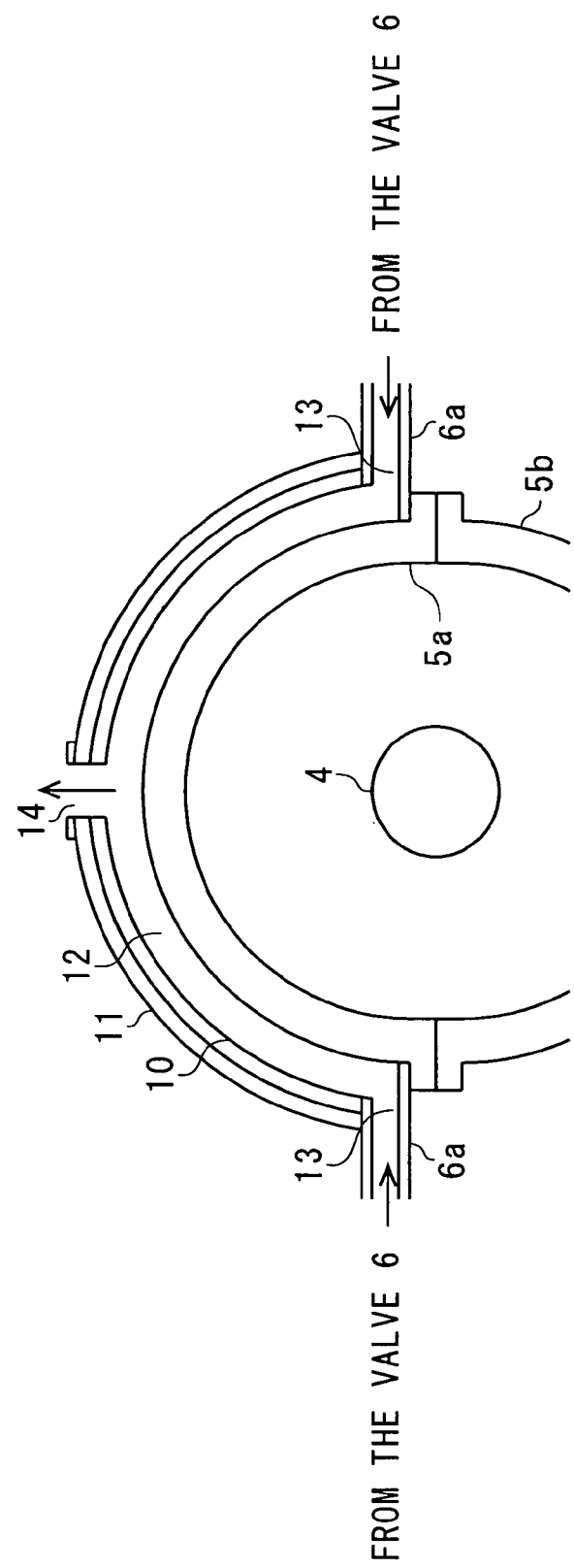
FIG. 12 is a cross-sectional view showing a construction of a casing of a gas turbine in accordance with an eighth embodiment of the present invention.

As shown in FIG. 12, the gas turbine in accordance with the present embodiment has a cover 10 in a shape of a semicircle so as to cover only the upper casing 5a; and at the same time, a thermal insulation 11 is provided so as to additionally cover the outside of the cover 10; wherein a space is made between the cover 10 and the upper casing 5a, serving as an air flow path 12. Then, the air flow path 12 has an end being close to the connection portion of the upper casing 5a to the lower casing 5b serve as the external air inlet port 13, and at the same time, has the air outlet port 14 provided to the uppermost part of the cover 10 and the thermal insulation 11.

Being constructed as mentioned hereinabove, the external air being supplied from the valve 6 is introduced to the air flow path 12 from the external air inlet port 13, and after streaming outside of the upper casing 5a from the lower part to the upper part of the air flow path 12 as the cooling air, the external air is discharged to the outside from the external air outlet port 14 that is provided to the uppermost part of the cover 10 and the thermal insulation 11. In consequence, after the operation is stopped, the upper casing 5a can be cooled by the cooling air flowing through the air flow path 12 that is provided between the cover 10 and the upper casing 5a, which can decrease the temperature difference between the upper casing 5a and the lower casing 5b, thereby preventing the thermal deformation of the casing 5.

In construction of the present embodiment, same as the second or the third embodiment, the external air may be supplied to the valve 6 from the blower or the compressor, and the control air being used at a plant may be supplied to the valve 6. Furthermore, the cover 10 and the thermal insulation 11 that are mentioned hereinabove may be provided only to the portions of the upper casing 5a constituting the combustor casing 5y and the turbine casing 5z that especially become high temperature.

Ninth Embodiment

A ninth embodiment of the present invention will be described by referring to the drawings. Same as the first embodiment, the gas turbine in accordance with the present embodiment has the gas turbine being constructed as in FIG. 1 serve as the basic construction. Being different from the eighth embodiment, the gas turbine in accordance with the present embodiment has an external air outlet port provided not to the cover but to the upper casing, which serves as the external air inlet port introducing the external air to the interior of the casing. Therefore, the construction of the periphery of the cover covering the outside of the upper casing will be described by referring to FIG. 13. In addition, FIG. 13 is a cross-sectional view showing a construction of the periphery of the cover covering the outside of the upper casing which is used for the gas turbine in accordance with the present embodiment.

Figure 13:
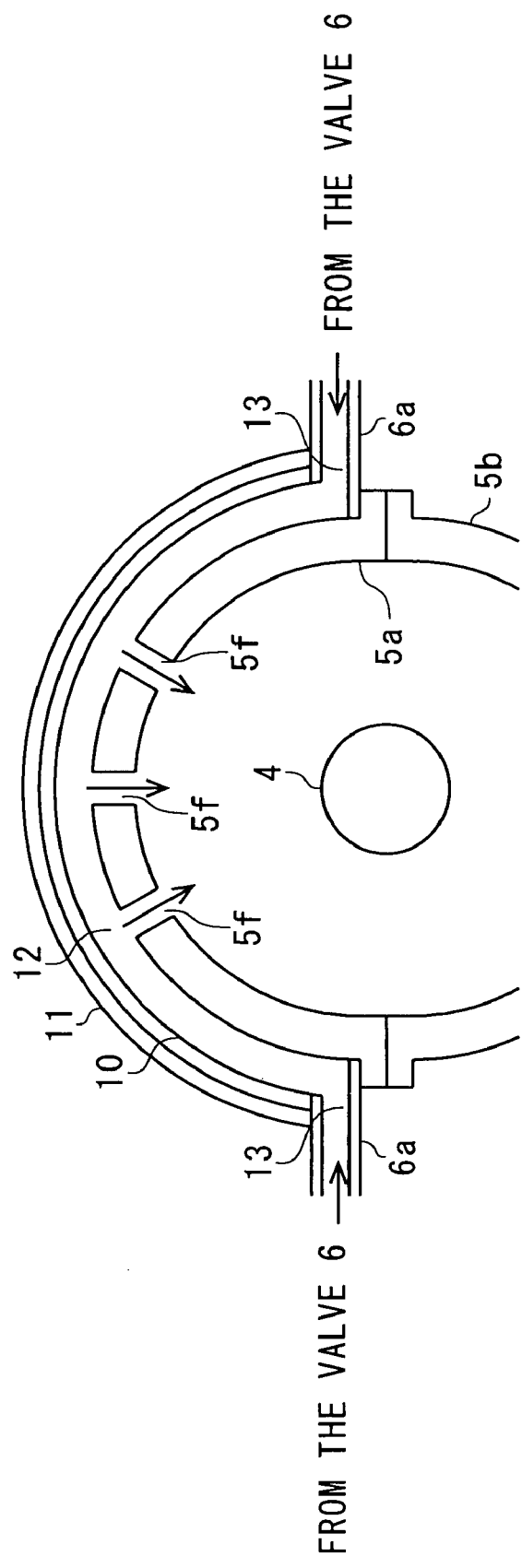
FIG. 13 is a cross-sectional view showing a construction of a casing of a gas turbine in accordance with a ninth embodiment of the present invention.

As shown in FIG. 13, the gas turbine in accordance with the present embodiment has an external air inlet port 5f provided to the upper casing 5a instead of the external air outlet port 14 shown in FIG. 12 in the same manner as the gas turbines in accordance with the first through the third embodiments. The external air inlet port 5f being provided to the upper casing 5a is provided to the higher position than the external air inlet port f3 which is provided to the air flow path 12 between the cover 10 and the upper casing 5a.

Being constructed in such a manner as mentioned hereinabove, the cooling air cooling the upper casing 5a from the outside wall surface of the upper casing 5a flows through the air flow path 12 and flows into the inside of the upper casing 5a by way of the external air inlet port 5f. To be specific, in the air flow path 12, the external air inlet port 5f plays the same role as the external air outlet port 14 in FIG. 12. The cooling air flowing into the inside of the upper casing 5a by way of the external air inlet port 5f gives the same effects to the casing 5 as the first embodiment.

In the present embodiment, a plurality of external air inlet ports 5f may be provided to the upper casing 5a as long as the external air inlet ports 5f are provided to higher locations than the external air inlet port 13 being provided to the air flow path 12. In addition, in the present embodiment, same as the eight embodiment, the external air may be supplied to the valve 6 from the blower or the compressor in the same manner as the second or the third embodiment, and the control air being used for the plant may be supplied to the valve 6.

Moreover, instead of the external air inlet port 5f, the external air inlet ports 5f1 through 5f3 that have the same configuration as the fourth through the sixth embodiments may be acceptable. Additionally, as the seventh embodiment, the external air inlet port 5f may be provided to the upper casing 5a constituting the combustor casing 5y, and at the same time, such a construction may be added as the cooling air being introduced to the combustor casing 5y is supplied to the interior of the rotor 4.

Tenth Embodiment

A tenth embodiment of the present invention will be described by referring to the drawings. Same as the first embodiment, the gas turbine in accordance with the present embodiment has the gas turbine being constructed as in FIG. 1 serve as the basic construction. In addition, the gas turbine in accordance with the present embodiment is provided with a cooling equipment which is constructed in such a manner as each of the above-mentioned embodiments as well as provided with a cooling system which regulates the volume of the external air being supplied to the cooling equipment. Therefore, the construction of the cooling system that is applied to the present gas turbine will be described by referring to FIG. 14. Additionally, FIG. 14 is a cross-sectional view showing a construction of the cooling system which is used for the gas turbine in accordance with the present embodiment.

Figure 14:
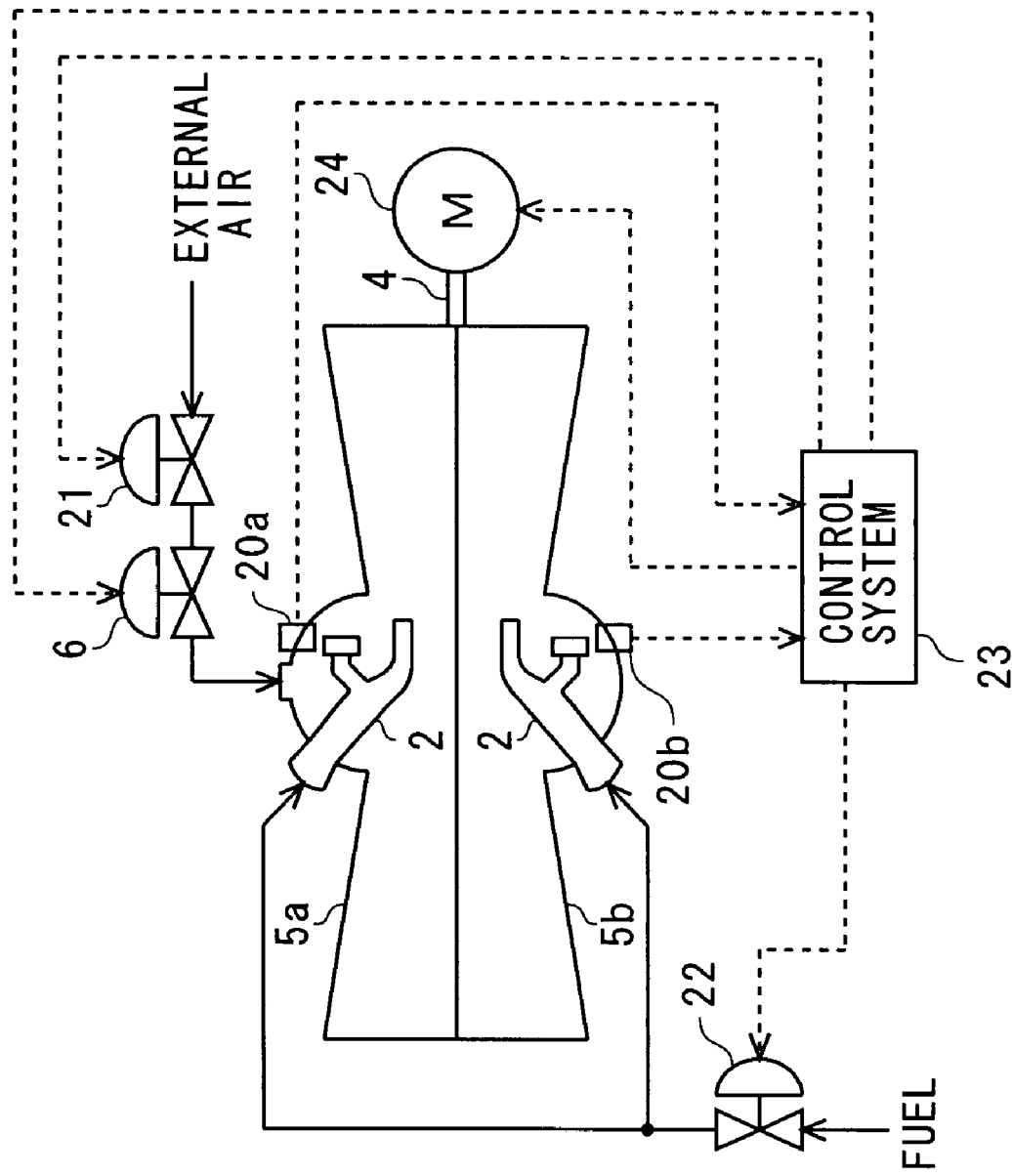
FIG. 14 is a diagram showing a construction of a cooling system of a gas turbine in accordance with a tenth embodiment of the present invention.

The cooling system of the gas turbine in FIG. 14 is provided with temperature detectors 20a and 20b such as thermocouples and the like which detect the temperature of the upper casing 5a and the lower casing 5b, respectively; an air flow control valve 21 which controls the flow volume of the external air cooling the upper casing 5a by way of the valve 6; a fuel flow control valve 22 which controls the flow volume of the fuel being supplied to the combustor 2; a control system 23 which controls the opening of the air flow control valve 21 based on the temperatures of the upper casing 5a and the lower casing 5b, respectively, that are detected by the temperature detectors 20a and 20b; and a motor 24 which rotates the rotor 4.

Figure 15:
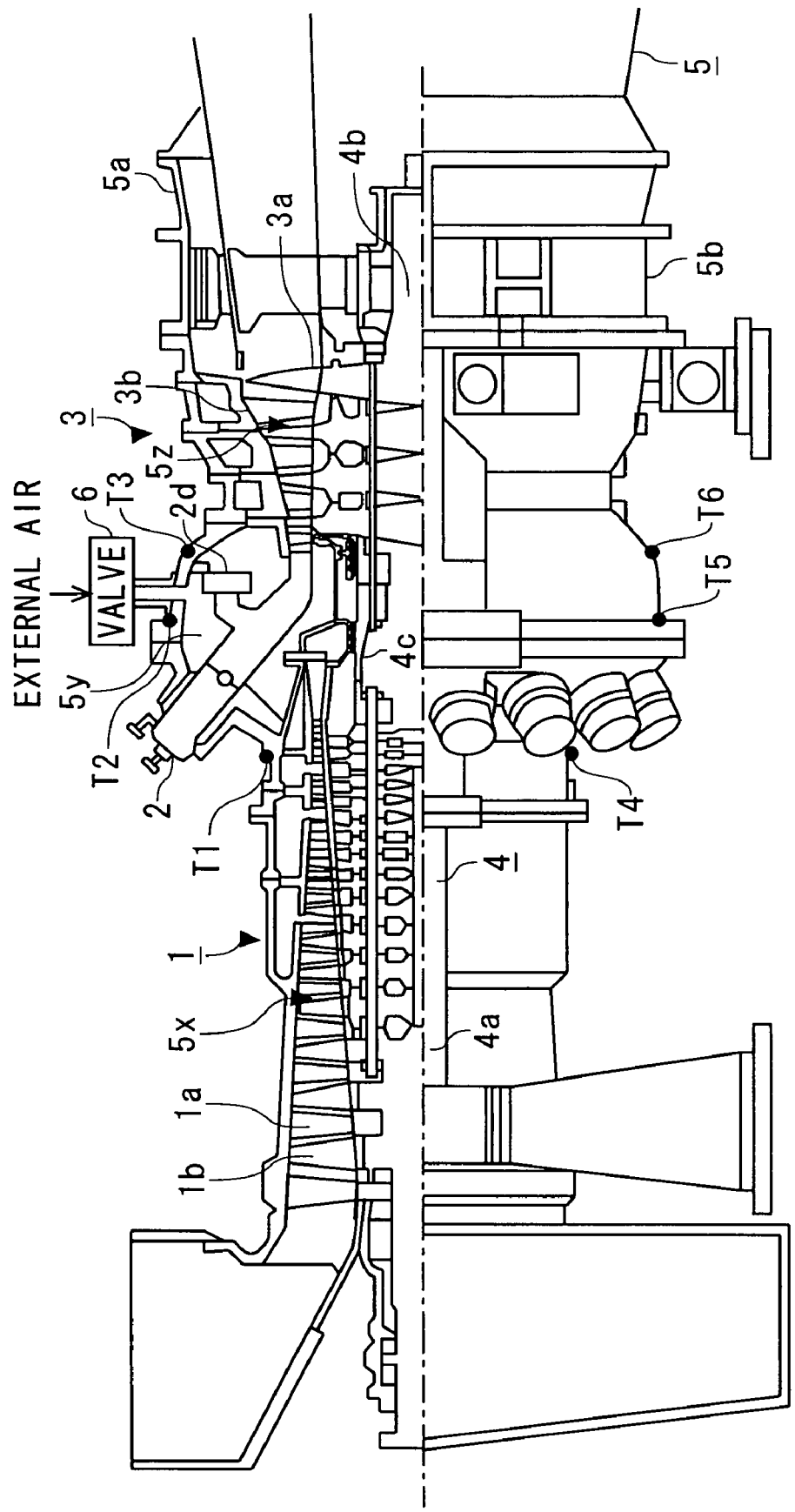
FIG. 15 is a diagram showing a positional relation of temperature detectors which are used for a cooling system of gas turbines in accordance with tenth through twelfth embodiments of the present invention.

Here, as shown in FIG. 15, the temperature detector 20a is installed to the position T1 in the vicinity of the border between the compressor casing 5x and the combustor casing 5y in the upper casing 5a and to the positions T2 and T3 in the vicinity of the bypass valve 2d in the combustor casing 5y. In addition, because the temperature detector 20b is provided to the position being symmetrical to the temperature detector 20a, having the rotor 4 serve as an axis, the temperature detector 20b is installed to the position T4 in the vicinity of the border between the compressor 5x and the combustor casing 5y in the lower casing 5b and to the positions T5 and T6 in the vicinity of the bypass valve 2d in the combustor casing 5y.

When the fuel flow control valve 22 is controlled by the control system 23 so as to make the flow volume of the fuel being supplied to the combustor 2 be null and the fuel flow control valve 22 is closed with the opening thereof being null, the gas turbine, being constructed as mentioned hereinabove, stops operation. Subsequently, by having the motor 24 driven by the control system 23, the rotor 4 is rotated at a very slow speed so as to perform turning operation, and at the same time, the valve 6 is opened, thereby making the upper casing 5a be ready for introduction of the external air. At this time, the control system 23 is supplied with each of the temperatures of the upper casing 5a and the lower casing 5b that are detected by the temperature detectors 20a and 20b, respectively.

Then, the temperature difference between the upper casing 5a and the lower casing 5b is obtained; and when the temperature difference increases, the control system 23 opens the opening of the air flow control valve 21 so as to increase the flow volume of the external air being supplied from the valve 6 to cool the upper casing 5a. In addition, when the temperature difference between the upper casing 5a and the lower casing 5b decreases, the opening of the air flow control valve 21 is closed so as to decrease the flow volume of the eternal air streaming through the valve 6 in order to reduce the cooling effect of the upper casing 5a. In such a manner as mentioned hereinabove, the temperature difference between the upper casing 5a and the lower casing 5b is decreased, thereby preventing the thermal deformation of the casing after stopping the operation.

Additionally, in the present embodiment, by providing the temperature detectors 20a and 20b so as to always monitor the temperature difference between the upper casing 5a and the lower casing 5b, the thermal deformation of the casing is prevented after the operation is stopped. However, as shown in FIG. 16, instead of the temperature detectors 20a and 20b, a timer 20c may be provided for controlling the opening of the air flow control valve 21 at an interval of a predetermined time, thereby preventing the thermal deformation of the casing after the operation is stopped.

Wherein, same as the cooling system being provided with the temperature detectors 20a and 20b, when the operation of the gas turbine is stopped, first, the motor 24 is driven so as to initiate the turning operation, and at the same time the valve 6 is opened. Subsequently, when the control system 23 confirms by the timer 20c that the predetermined time t1 has passed, the opening of the air flow control valve 21 is opened so as to introduce the external air serving as the cooling air of the upper casing 5a. When it is confirmed by the timer 20c that the predetermined time t2 has passed after the external air is introduced from the valve 6 in a manner as mentioned hereinabove, the opening of the air flow control valve 21 is closed so as to decrease the supply amount of the external air from the valve 6, and eventually the air flow control valve 21 is closed.

Figure 16:
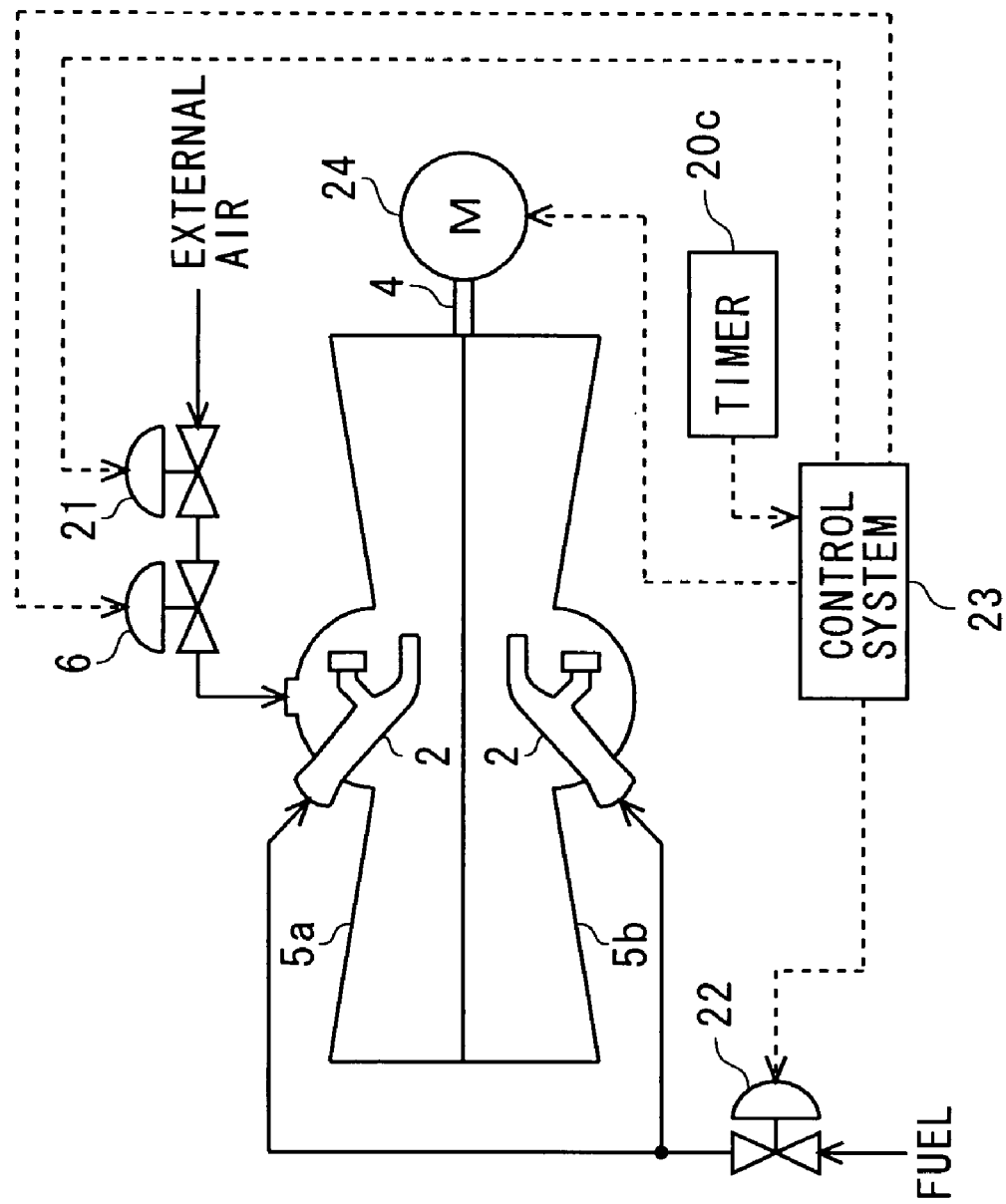
FIG. 16 is a diagram showing another construction of a cooling system of a gas turbine in accordance with a tenth embodiment of the present invention.

After the gas turbine operation is stopped, by providing the timer 20c as in FIG. 16, the supply amount of the external air to the upper casing 5a is controlled in accordance with the time, thereby preventing the thermal deformation of the casing after the gas turbine operation is stopped. At this time, by measuring the time for controlling the opening of the air flow control valve 21 in advance and by having the control system 23 memorize the measured time, the optimum time control can be achieved for the opening of the air flow control valve 21.

The temperature detectors 20a and 20b may not be installed to the upper casing 5a and the lower casing 5b, respectively, as shown in FIG. 14. However, only the temperature detector 20a may be installed to the upper casing 5a so as to control the opening of the air flow control valve 21 in accordance with the temperature of the upper casing 5a. Moreover, by providing the above-mentioned temperature detectors 20a and 20b in addition to the cooling system as FIG. 16, the control time may be changed in accordance with the temperature when the gas turbine operation is stopped.

Eleventh Embodiment

An eleventh embodiment of the present invention will be described by referring to the drawings. Same as the first embodiment, the gas turbine in accordance with the present embodiment has the gas turbine being constructed as in FIG. 1 serve as the basic construction. In addition, the gas turbine in accordance with the present embodiment is constructed in such a manner as the first through the seventh embodiments or the ninth embodiment and is provided with a cooling system which regulates the volume of the external air being supplied to the upper casing. Moreover, being different from the tenth embodiment, the volume of the external air being supplied is regulated by the inlet guide vane being provided to the compressor.

Figure 17:
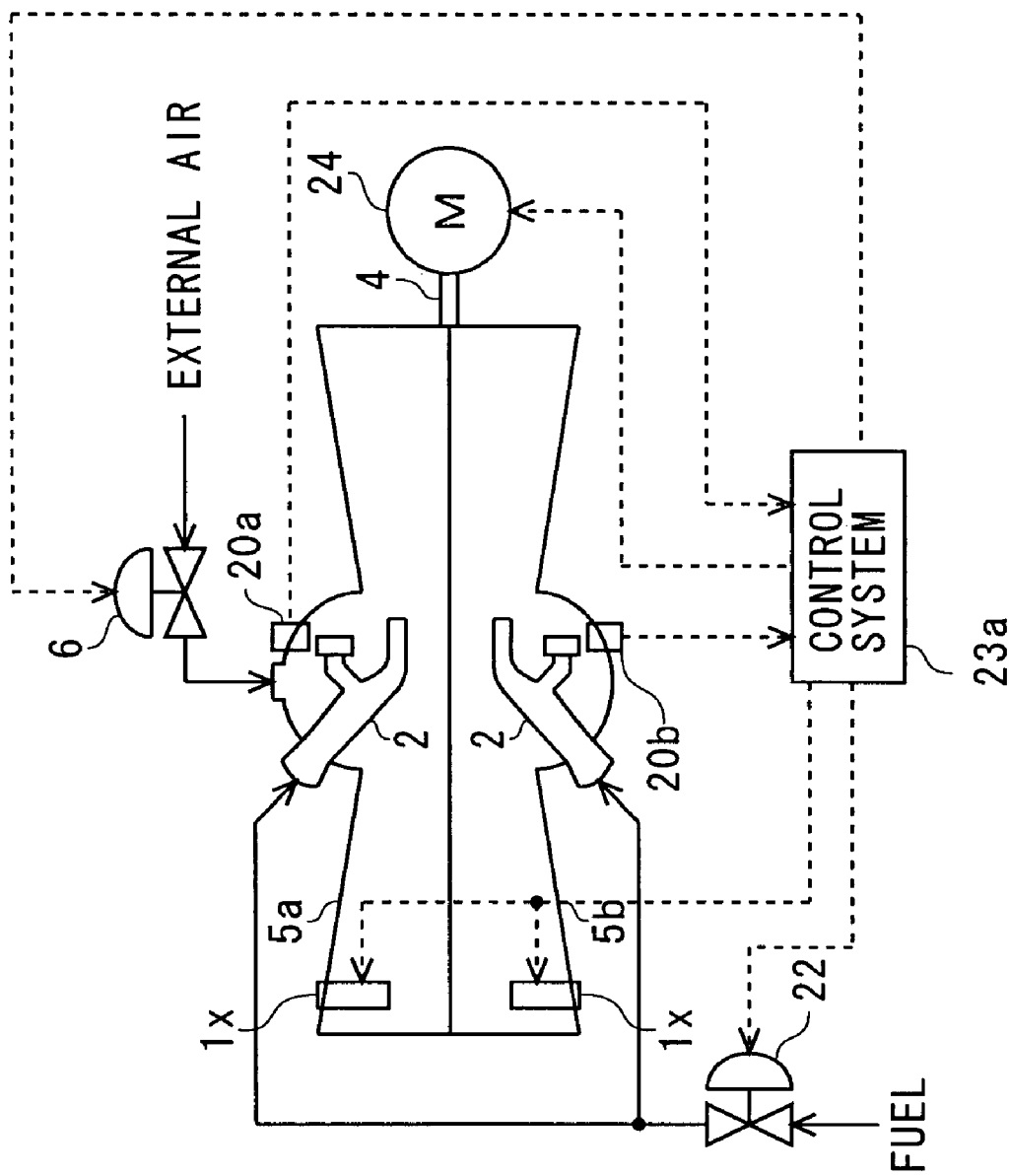
FIG. 17 is a diagram showing a construction of a cooling system of a gas turbine in accordance with an eleventh embodiment of the present invention.

The construction of the cooling system being applicable to the gas turbine in accordance with the present embodiment will be described by referring to FIG. 17. FIG. 17 is a cross-sectional view showing the construction of the cooling system that is used for the gas turbine in accordance with the present embodiment. The same portions as the construction in FIG. 14 will be supplied with the same symbols and the detailed description thereof will be omitted.

The cooling system of the gas turbine of FIG. 17 is provided with the control system 23a which controls the opening of the inlet guide vane 1x being supplied to the compressor 1 on the basis of the temperatures of the upper casing 5a and the lower casing 5b, respectively, that are detected by the temperature detectors 20a and 20b as well as with the temperature detectors 20a and 20b, a fuel flow control valve 22 and the motor 24 in FIG. 14. Here, same as the tenth embodiment, each of the temperature detectors 20a and 20b is provided to the positions T1 through T3 of the upper casing 5a and to the positions T4 through T6 of the lower casing 5b, respectively, as shown in FIG. 15. Same as the tenth embodiment, the cooling system being constructed as mentioned hereinabove controls the flow volume of the external air being supplied to the upper casing 5a in accordance with the temperature differences that are detected by the temperature detectors 20a and 20b, thereby preventing the thermal deformation of the casing 5.

To be specific, after the gas turbine operation is stopped, the valve 6 is opened, and at the same time the motor 24 is driven, so as to initiate the turning operation. Subsequently, when the temperature difference between the upper casing 5a and the lower casing 5b is increased, the control system 23a controls the inlet guide vane 1x to close. By doing this, the volume of the air being supplied from the compressor 1 is decreased, which reduces the pressure inside the casing 5, thereby increasing the flow volume of the external air being introduced to the upper casing 5a from the valve 6.

Subsequently, when it is confirmed that the temperature difference between the upper casing 5a and the lower casing 5b is decreased, the control system 23a controls the inlet guide vane 1x to open. In consequence, by increasing the volume of the air being supplied from the compressor 1, the pressure inside the casing 5 is increased, thereby reducing the flow volume of the external air being introduced to the upper casing 5a from the valve 6. Then, when the temperature difference comes to the point requiring no introduction of the external air, the valve 6 is closed so as to stop the supply of the external air to the upper casing 5a.

Figure 18:
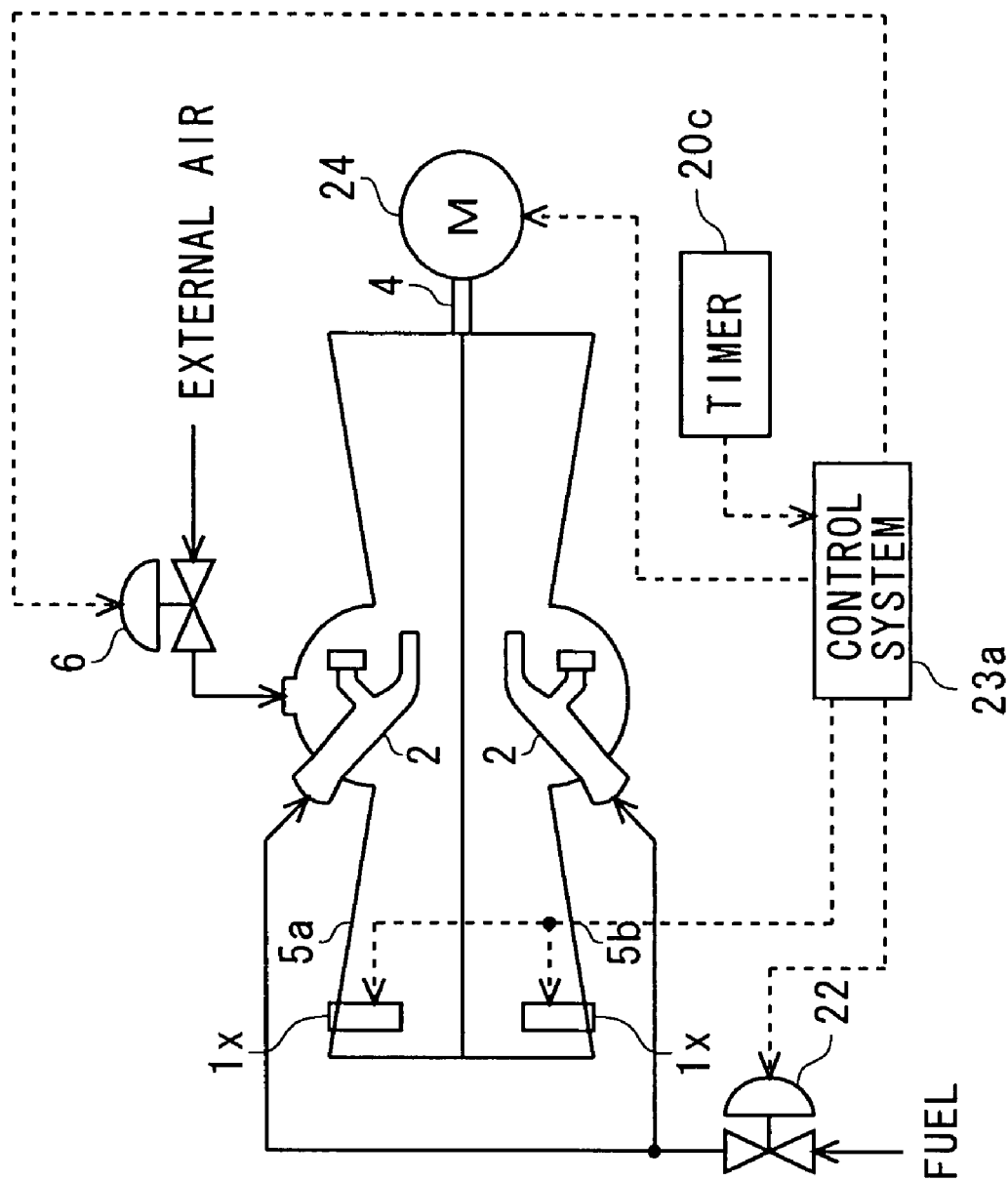
FIG. 18 is a diagram showing another construction of a cooling system of a gas turbine in accordance with an eleventh embodiment of the present invention.

Being different from the tenth embodiment, in the present embodiment, by adjusting the opening of the inlet guide vane 1x, the flow volume of the cooling air being supplied to the upper casing 5a is adjusted, thereby preventing the thermal deformation of the casing 5. In addition, same as the tenth embodiment, the present embodiment may have a timer 20c provided thereto instead of the temperature detectors 20a and 20b as shown in FIG. 18, so that the opening of the inlet guide vane 1x will be controlled by the time being measured by the timer 20c. To be specific, after the gas turbine operation is stopped, first when the time t1 has passed, the inlet guide vane 1x is closed so as to increase the flow volume of the cooling air. Subsequently, when the time t2 has passed, the inlet guide vane 1x is opened so as to decrease the flow volume of the cooling air. In addition, in the present embodiment, the inlet guide vane 1x which has the opening thereof adjusted for adjusting the flow volume of the cooling air may only be a part of the inlet guide vane 1x which is covered by the upper casing 5a or may be all inlet guide vanes 1x that are provided to the compressor 1.

Twelfth Embodiment

A twelfth embodiment of the present invention will be described by referring to the drawings. Same as the first embodiment, the gas turbine in accordance with the present embodiment has the gas turbine being constructed as in FIG. 1 serve as the basic construction. In addition, the gas turbine in accordance with the present embodiment is constructed in such a manner as the first through the seventh embodiments or the ninth embodiment and is provided with a cooling system which regulates the volume of the external air being supplied to the upper casing. Moreover, being different from the tenth and the eleventh embodiments, the volume of the external air to be supplied is adjusted by the bypass valve being provided to the combustor.

Figure 19:
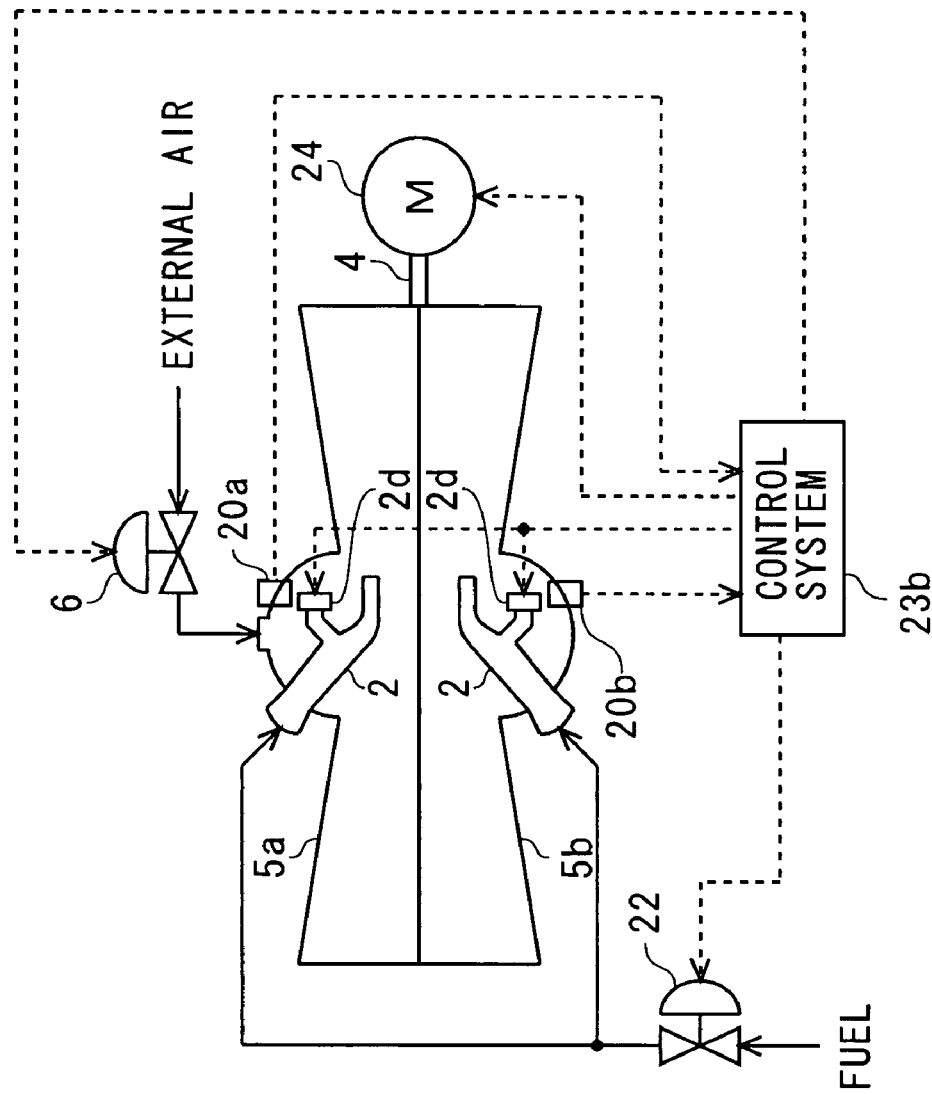
FIG. 19 is a diagram showing a construction of a cooling system of a gas turbine in accordance with a twelfth embodiment of the present invention.

The construction of the cooling system being applied to the gas turbine in accordance with the present embodiment will be described hereinafter by referring to FIG. 19. FIG. 19 is a cross-sectional view showing the construction of the cooling system which is used for the gas turbine in accordance with the present embodiment. The same portions as the construction of FIG. 14 will be provided with the same symbols and the detailed description thereof will be omitted. In addition, in the present embodiment, any of the external air inlet ports 5f and 5f1 through 5f3 is provided to the upper casing 5a constructing the combustor casing 5y.

In addition to the temperature detectors 20a and 20b, a fuel flow control valve 22 and the motor 24 in FIG. 14, the cooling system of the gas turbine of FIG. 19 is provided with a control system 23b which controls the opening of the bypass valve 2d being installed to the combustor 2 on the basis of each of the temperatures of the upper casing 5a and the lower casing 5b, respectively, that are detected by the temperature detectors 20a and 20b; wherein, as shown in FIG. 15, each of the temperature detectors 20a and 20b is installed to the locations T1 through T3 of the upper casing 5a and to the locations T4 through T6 of the lower casing 5b, respectively, in the same manner as the tenth embodiment. Same as the tenth embodiment, the cooling system being constructed as mentioned hereinabove prevents the thermal deformation of the casing 5 by controlling the flow volume of the external air being supplied to the upper casing 5a in accordance with the temperature difference being detected by each of the temperature detectors 20a and 20b.

To be specific, when the operation of a gas turbine is stopped, the valve 6 is opened and the motor 24 is operated so as to initiate the turning operation. After that, when the temperature difference between the upper casing 5a and the lower casing 5b increases, the control system 23b is operated to control the bypass valve 2d to close. In such a manner as aforementioned, the volume of the air going away to the combustor 2 from the bypass valve 2d is decreased, thereby enhancing the cooling effect on the combustor casing 5y that is given by the external air being introduced to the combustor casing 5y.

Subsequently, when it is confirmed that the temperature difference between the upper casing 5a and the lower casing 5b is decreased, the bypass valve 2d is controlled by the control system 23b to open. In consequence, by having the external air being introduced to the combustor casing 5*y* go away from the bypass valve 2*d* to the turbine casing 5*z* and the like by way of the combustor 2, the cooling effect given by the external air is dispersed to each of the casings being constructed by the casing 5. Then, when the temperature difference becomes such as requires no external air to be introduced, the valve 6 is closed so as to stop the supply of the external air to the upper casing 5*a*.

Figure 20:
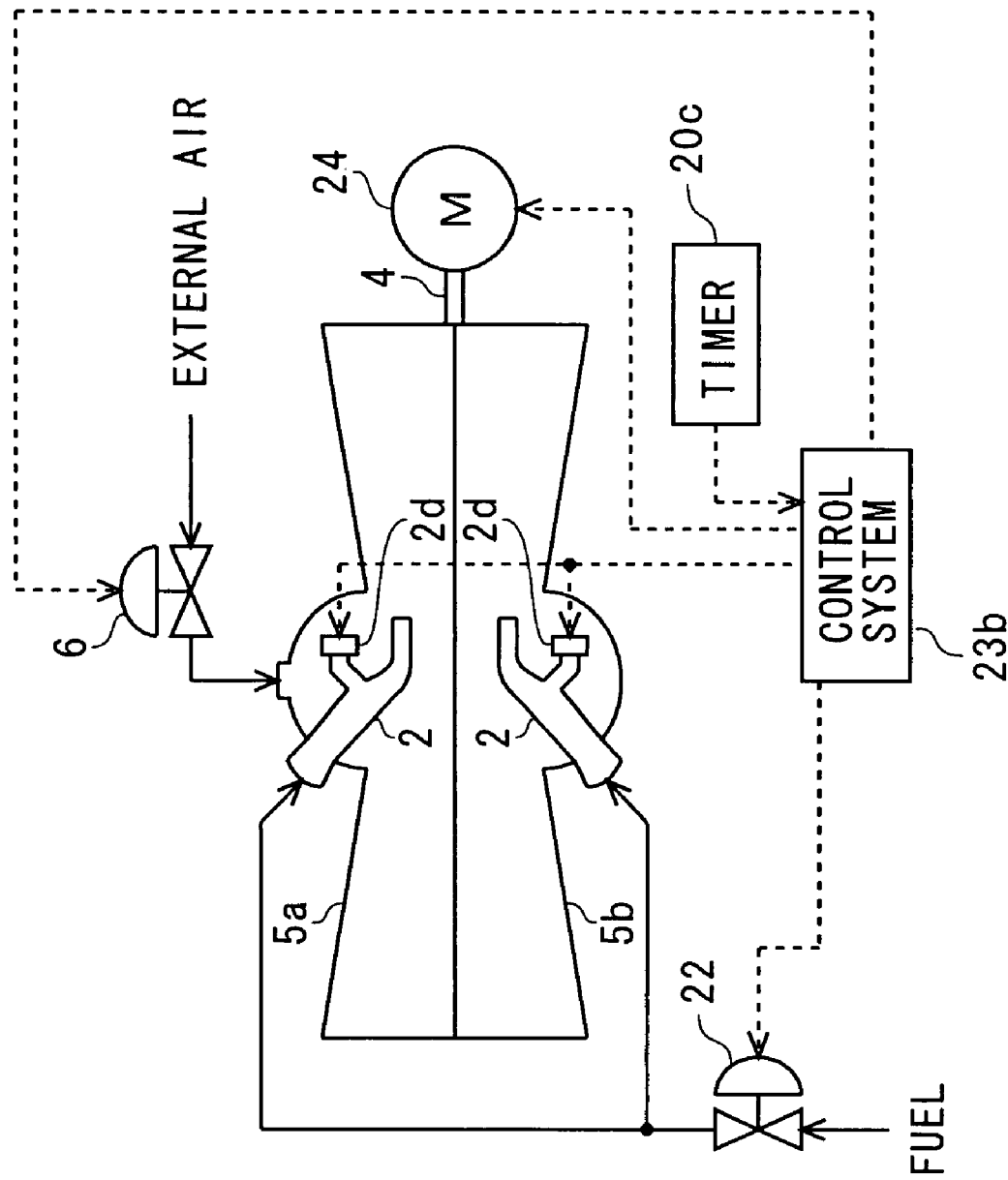
FIG. 20 is a diagram showing another construction of a cooling system of a gas turbine in accordance with a twelfth embodiment of the present invention.

As mentioned hereinabove, being different from the tenth embodiment, the present embodiment prevents the thermal deformation of the casing 5 by adjusting the opening of the bypass valve 2*d* so as to adjust the flow of the cooling air being supplied to the combustor 5*y*. In addition, same as the tenth embodiment, the present embodiment may have a timer 20*c* installed thereto instead of the temperature detectors 20*a* and 20*b* as shown in FIG. 20 so as to control the opening of the bypass valve 2*d* in accordance with the time being measured by the timer 20*c*. To be specific, after the operation of the gas turbine is stopped, first after the time t1 passes, the bypass valve 2*d* is closed so as to increase the flow volume of the cooling air in the combustor casing 5*y*. Subsequently, after the time t2 passes, the bypass valve 2*d* is opened so as to decrease the flow volume of the cooling air in the combustor casing 5*y*. In addition, in the present embodiment, the combustor 2, wherein the opening of the bypass valve 2*d* is adjusted for adjusting the flow volume of the cooling air, may be applied only to the combustor 2 that is covered by the upper casing 5*a* or may be applied to all the combustors 2.

Moreover, the cooling system of the gas turbine in accordance with the present invention may have another construction such as a construction combining the cooling systems of the gas turbines in accordance with the tenth through the twelfth embodiments. To be specific, by combining the controls of the openings of the air flow control valve 21, the inlet guide vane 1*x* and the bypass valve 2*d*, an optimum cooling performance can be achieved in order to prevent the thermal deformation of the casing 5.

What is claimed is:

1. A casing comprising:
   an upper casing which covers an upper half of a rotating body being rotated by high temperature fluid;
   a lower casing which covers a lower half of the rotating body;
   a valve which controls supply of cooling air cooling the upper casing;
   a first cooling air flow path where the cooling air flows is provided to the upper casing and is constructed by the upper casing and the lower casing; and
   an air inlet port which introduces the cooling air being supplied from the valve to the first cooling air flow path is formed in a shape of a nozzle to have an end thereof on a side of an inner wall surface of the upper casing tapered;
   wherein, after stopping operation of the rotating body by the high temperature fluid, the valve is opened so as to introduce the cooling air to the first cooling air flow path from the air inlet port.

2. A casing comprising:
   an upper casing which covers an upper half of a rotating body being rotated by high temperature fluid;
   a lower easing which covers a lower half of the rotating body;
   a valve which controls supply of cooling air cooling the upper casing;
   a first cooling air flow path where the cooling air flows is provided to the upper casing and is constructed by the upper casing and the lower casing;
   an air inlet port which introduces the cooling air being supplied from the valve to the first cooling air flow path; and
   a cooling air supply pipe which supplies an interior of the rotating body with the cooling air being supplied from the air inlet port to an interior of the casing in order to cool the rotating body is installed to an outer wall surface of the rotating body on a side of the upper casing;
   wherein, after stopping operation of the rotating body by the high temperature fluid, the valve is opened so as to introduce the cooling air to the first cooling air flow path from the air inlet port.

3. A casing comprising:
   an upper casing which covers an upper half of a rotating body being rotated by high temperature fluid;
   a lower casing which covers a lower half of the rotating body;
   a valve which controls supply of cooling air cooling the upper casing;
   a first cooling air flow path where the cooling air flows is provided to the upper casing and is constructed by the upper casing and the lower casing;
   an air inlet port which introduces the cooling air being supplied from the valve to the first cooling air flow path;
   a cover in a shape of approximately semicircle which covers the upper casing; and
   a second cooling air flow path where the cooling air flows from the valve is formed between an inner wall surface of the cover and an outer wall surface of the upper casing;
   wherein, after stopping operation of the rotating body by the high temperature fluid, the valve is opened so as to introduce the cooling air to the first cooling air flow path from the air inlet port, and the cooling air is introduced from the air inlet port to the second cooling air flow path.

4. A casing comprising:
   an upper casing which covers an upper half of a rotating body being rotated by high temperature fluid;
   a lower easing which covers a lower half of the rotating body;
   a valve which controls supply of cooling air cooling the upper easing;
   a first cooling air flow path where the cooling air flows is provided to the upper casing and is constructed by the upper casing and the lower casing; and
   an air inlet port which introduces the cooling air being supplied from the valve to the first cooling air flow path;
   wherein, the air inlet port comprises:
   a suction port which is provided to a side of an outer wall surface of the upper casing and connected to the first cooling air flow path from the valve;
   an injection port which is provided to a side of an inner wall surface of the upper casing and injects the cooling air to an interior of the casing;
   an air-introduction slot which is provided to a side of outer wall of the upper casing and connects the suction port and the injection port; and
   a cover which covers the air-introduction slot; and
   wherein, after stopping operation of the rotating body by the high temperature fluid, the valve is opened so as to introduce the cooling air to the first cooling air flow path from the air inlet port.

5. A casing as described in claim 4:
   wherein, the air inlet port is provided so as to have an end thereof on a side of an inner wall surface of the upper casing face toward a heat source inside the casing.

6. A casing as described in claim 4:
wherein, the air inlet port is provided so as to have an end thereof on a side of an inner wall surface of the upper casing face toward an inner wall surface of the upper casing.

7. A casing as described in claim 4:
wherein, the air inlet port is formed in a shape of a nozzle to have an end thereof on a side of inner wall surface of the upper casing tapered.

8. A casing as described in claim 4:
wherein, a cooling air supply pipe that supplies an interior of the rotating body with the cooling air being supplied from the air inlet port to an interior of the casing in order to cool the rotating body is installed to an outer wall surface of the rotating body on a side of the upper casing.

9. A casing as described in claim 4:
wherein, a cover in a shape of approximately semicircle which covers the upper casing is provided;
a second cooling air flow path where the cooling air flows from the valve is formed between an inner wall surface of the cover and an outer wall surface of the upper casing; and
the cooling air is introduced from the air inlet port to the second cooling air flow path.

10. A casing comprising:
an upper casing which covers an upper half of a rotating body being rotated by high temperature fluid;
a lower casing which covers a lower half of the rotating body;
a valve which controls supply of cooling air cooling the upper casing;
a first cooling air flow path where the cooling air flows; and
an air inlet port which introduces the cooling air being supplied from the valve to the first cooling air flow path;
wherein, after stopping operation of the rotating body by the high temperature fluid, the valve is opened so as to introduce the cooling air to the first cooling air flow path from the air inlet port,
wherein, the rotating body comprises a compressor and a turbine that have rotating blades installed to a periphery thereof;
such a combustor is provided as rotates the turbine by supplying the turbine with combustion gas being obtained by burning a fuel with an air compressed by the compressor; and
the casing comprises a compressor casing housing the compressor, a combustor casing housing the combustor and a turbine casing housing the turbine.

11. A casing as described in claim 10:
wherein, the air inlet port is installed to a portion of the upper casing where the combustor casing is formed; and
the cooling air is introduced from the valve to the combustor casing.

12. A casing as described in any one of claims 1 to 3:
wherein, a cover in a shape of approximately semicircle which covers the upper casing is provided;
a second cooling air flow path where the cooling air flows from the valve is formed between an inner wall surface of the cover and an outer wall surface of the upper casing; and
the cooling air is introduced from the air inlet port to the second cooling air flow path.

13. A casing comprising:
an upper casing which covers an upper half of a rotating body being rotated by high temperature fluid;
a lower casing which covers a lower half of the rotating body;
a valve which controls supply of cooling air cooling the upper casing;
a first cooling air flow path where the cooling air flows; and
an air inlet port which introduces the cooling air being supplied from the valve to the first cooling air flow path;
wherein, after stopping operation of the rotating body by the high temperature fluid, the valve is opened so as to introduce the cooling air to the first cooling air flow path from the air inlet port,
wherein, control air of a plant is diverged so as to be supplied to the valve as the cooling air.

14. A gas turbine comprising:
a compressor which compresses external air;
a combustor which burns a fuel by using air being compressed by the compressor;
a turbine which is rotated by being supplied with combustion gas being obtained by the combustor;
a casing as in any one of claims 1 to 9 which cover the compressor, the combustor and the turbine, respectively, having the rotating body comprise a compressor and a turbine that have rotating blades installed to a periphery thereof; and
a control system which controls a temperature difference between the upper casing and the lower casing so as to be reduced by opening the valve and introducing the cooling air to the air inlet port after stopping operation.

15. A gas turbine as described in claim 14:
wherein, the control system controls the temperature difference, by controlling a flow of the cooling air being supplied to the air inlet port from the valve.

16. A gas turbine as described in claim 15:
wherein, the control system is provided with temperature-detecting portions, which detect at least one of temperatures of the upper casing and the lower casing; and
a flow of the cooling air being supplied to the air inlet port from the valve is controlled on the basis of each of temperatures of the upper casing and the lower casing that are detected by the temperature-detecting portions.

17. A gas turbine as described in claim 15:
wherein, the control system is provided with a timer for measuring a time after operation is stopped; and
a flow of the cooling air being supplied to the air inlet port from the valve is controlled on the basis of a time that is measured by the timer.

18. A gas turbine as described in claim 14:
wherein, an inlet guide vane that can change an opening thereof is provided to the compressor; and
a flow of the cooling air being introduced into an interior of the easing is adjusted, by controlling an opening of the inlet guide vane.

19. A gas turbine as described in claim 14:
a bypass-valve is provided to a transition piece at art end of the combustor; and
a flow of the cooling air streaming through a combustor casing where the combustor is provided is adjusted, by changing over an opening of the bypass valve.

* * * * *